(12) United States Patent
Fischer et al.

(10) Patent No.: US 9,204,337 B2
(45) Date of Patent: Dec. 1, 2015

(54) BANDWIDTH MECHANISMS AND SUCCESSIVE CHANNEL RESERVATION ACCESS WITHIN MULTIPLE USER, MULTIPLE ACCESS, AND/OR MIMO WIRELESS COMMUNICATIONS

(75) Inventors: Matthew James Fischer, Mountain View, CA (US); Peiman Amini, Mountain View, CA (US); Vinko Erceg, Cardiff by the Sea, CA (US); Rajendra Tushar Moorti, Mountain View, CA (US)

(73) Assignee: BROADCOM CORPORATION, Irvine, CA (US)

( * ) Notice: Subject to any disclaimer, the term of this patent is extended or adjusted under 35 U.S.C. 154(b) by 1259 days.

(21) Appl. No.: 13/037,076

(22) Filed: Feb. 28, 2011

(65) Prior Publication Data
US 2011/0222490 A1 Sep. 15, 2011

Related U.S. Application Data

(60) Provisional application No. 61/311,877, filed on Mar. 9, 2010.

(51) Int. Cl.
| | |
|---|---|
| *H04W 28/26* | (2009.01) |
| *H04W 72/12* | (2009.01) |
| *H04W 72/04* | (2009.01) |
| *H04L 5/00* | (2006.01) |
| *H04B 7/04* | (2006.01) |
| *H04B 7/06* | (2006.01) |

(52) U.S. Cl.
CPC ............. *H04W 28/26* (2013.01); *H04L 5/0007* (2013.01); *H04L 5/0037* (2013.01); *H04L 5/0092* (2013.01); *H04W 72/121* (2013.01); *H04W 72/1215* (2013.01); *H04B 7/0452* (2013.01); *H04B 7/0669* (2013.01); *H04B 7/0697* (2013.01); *H04W 72/042* (2013.01)

(58) Field of Classification Search
None
See application file for complete search history.

(56) References Cited

U.S. PATENT DOCUMENTS

| 7,343,162 B2* | 3/2008 | Tandai et al. ................. 455/450 |
| 2005/0152299 A1* | 7/2005 | Stephens ....................... 370/315 |
| 2006/0050742 A1* | 3/2006 | Grandhi et al. ............... 370/506 |
| 2008/0095195 A1* | 4/2008 | Ahmadi et al. ............... 370/478 |
| 2009/0088158 A1* | 4/2009 | Wang et al. ................... 455/436 |
| 2010/0322166 A1* | 12/2010 | Sampath et al. .............. 370/329 |
| 2013/0070623 A1* | 3/2013 | Chun et al. .................... 370/252 |

* cited by examiner

*Primary Examiner* — Christopher Crutchfield
(74) *Attorney, Agent, or Firm* — Garlick & Markison; Shayne X. Short

(57) ABSTRACT

Bandwidth mechanisms and successive channel reservation access within multiple user, multiple access, and/or MIMO wireless communications. A management frame, communicated from one wireless communication devices to one or more others, includes successive channel reservation assignment therein, and also indicates channel(s) within cluster(s) for use in respective communications (e.g., transmissions/receptions) of those wireless communication device(s) that receive the management frame. Subsequent management frames can modify or update such a channel assignment. Channel reservation for use in communications by respective wireless communication devices may be grown when additional channels may become available. Based on later determined information regarding the channel availability status, such channels that may become available can be used for subsequent, wider bandwidth communications. All communications include a primary channel (as indicated by a management frame, prior control frame, or other means) that may be located at a band edge or between respective channels (e.g., not at a band edge).

34 Claims, 25 Drawing Sheets

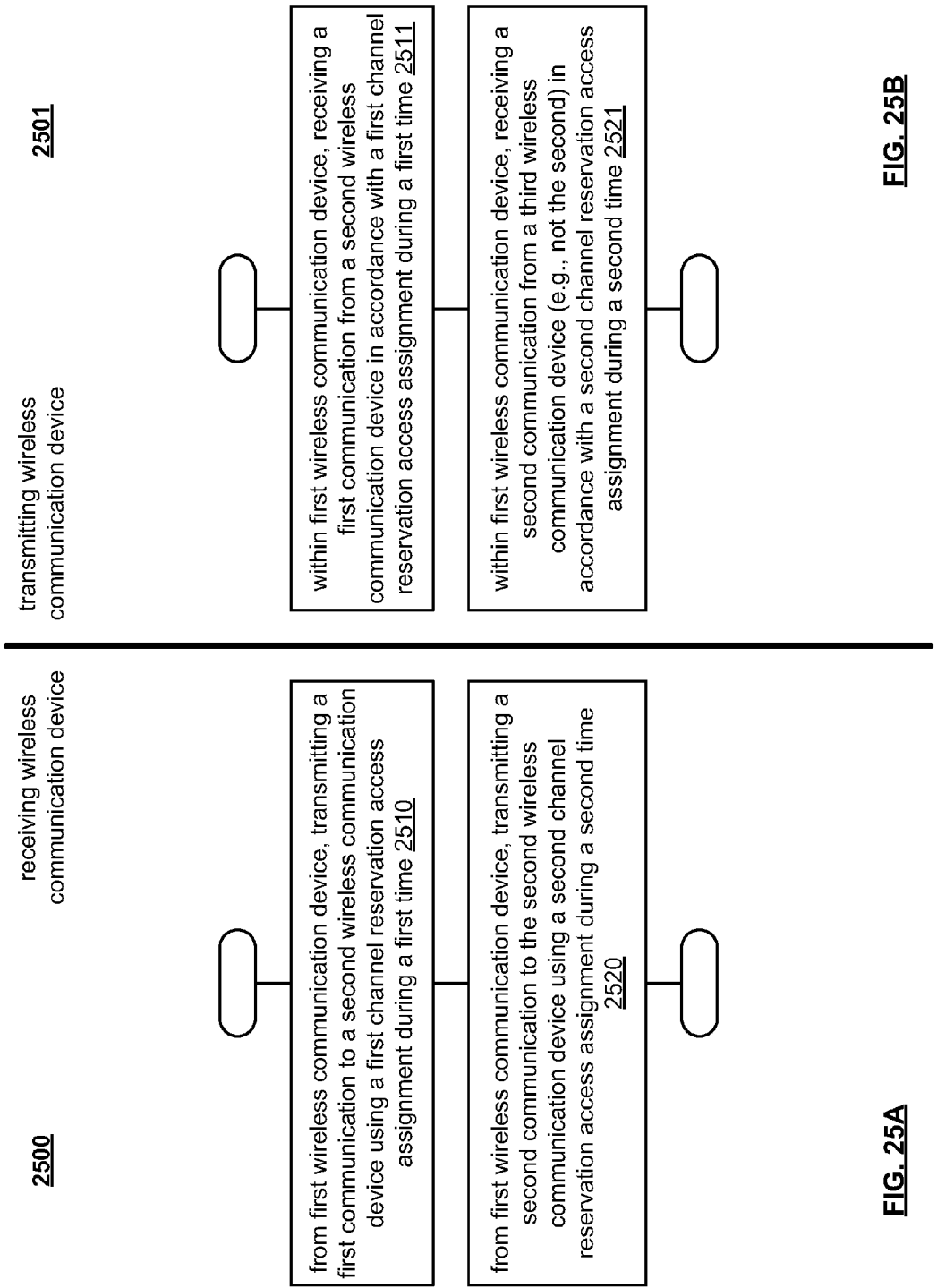

BANDWIDTH MECHANISMS AND SUCCESSIVE CHANNEL RESERVATION ACCESS WITHIN MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:
1. U.S. Provisional Application Ser. No. 61/311,877, entitled "Next generation WLAN bandwidth mechanisms and successive channel reservation access," filed Mar. 9, 2010.

INCORPORATION BY REFERENCE

The following U.S. Utility Patent Applications are hereby incorporated herein by reference in their entirety and are made part of the present U.S. Utility Patent Application for all purposes:
1. U.S. Utility patent application Ser. No. 12/794,707, entitled "Cluster parsing for signaling within multiple user, multiple access, and/or MIMO wireless communications," filed on Jun. 4, 2010, pending.
2. U.S. Utility patent application Ser. No. 12/794,711, entitled "Transmission acknowledgement within multiple user, multiple access, and/or MIMO wireless communications," filed on Jun. 4, 2010, pending.
3. U.S. Utility patent application Ser. No. 12/796,654, entitled "Channel characterization and training within multiple user, multiple access, and/or MIMO wireless communications," filed on Jun. 8, 2010, pending.
4. U.S. Utility patent application Ser. No. 12/796,655, entitled "Group identification and definition within multiple user, multiple access, and/or MIMO wireless communications," filed on Jun. 8, 2010, pending.
5. U.S. Utility patent application Ser. No. 12/852,438, entitled "Management frame directed cluster assignment within multiple user, multiple access, and/or MIMO wireless communications," filed on Aug. 6, 2010, pending.
6. U.S. Utility patent application Ser. No. 12/852,435, entitled "Management frame map directed operational parameters within multiple user, multiple access, and/or MIMO wireless communications," filed on Aug. 6, 2010, pending.
7. U.S. Utility patent application Ser. No. 12/949,921, entitled "Group identification and definition employing look up table (LUT) within multiple user, multiple access, and/or MIMO wireless communications," filed on Nov. 19, 2010, pending.

INCORPORATION BY REFERENCE

The following IEEE standards are hereby incorporated herein by reference in their entirety and are made part of the present U.S. Utility Patent Application for all purposes:
1. IEEE Std 802.11™—2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™-2007, (Revision of IEEE Std 802.11-1999), 1233 pages.
2. IEEE Std 802.11n™—2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™—2009, (Amendment to IEEE Std 802.11™—2007 as amended by IEEE Std 802.11k™—2008, IEEE Std 802.11r™—2008, IEEE Std 802.11y™—2008, and IEEE Std 802.11r™—2009), 536 pages.

BACKGROUND OF THE INVENTION

1. Technical Field of the Invention

The invention relates generally to communication systems; and, more particularly, it relates to bandwidth mechanisms and successive channel reservation access within multiple user, multiple access, and/or MIMO wireless communications.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 23A, FIG. 23B, FIG. 24, FIG. 25A, and FIG. 25B illustrate embodiments of methods for operating wireless communication devices.

DETAILED DESCRIPTION OF THE INVENTION

Figure 1:
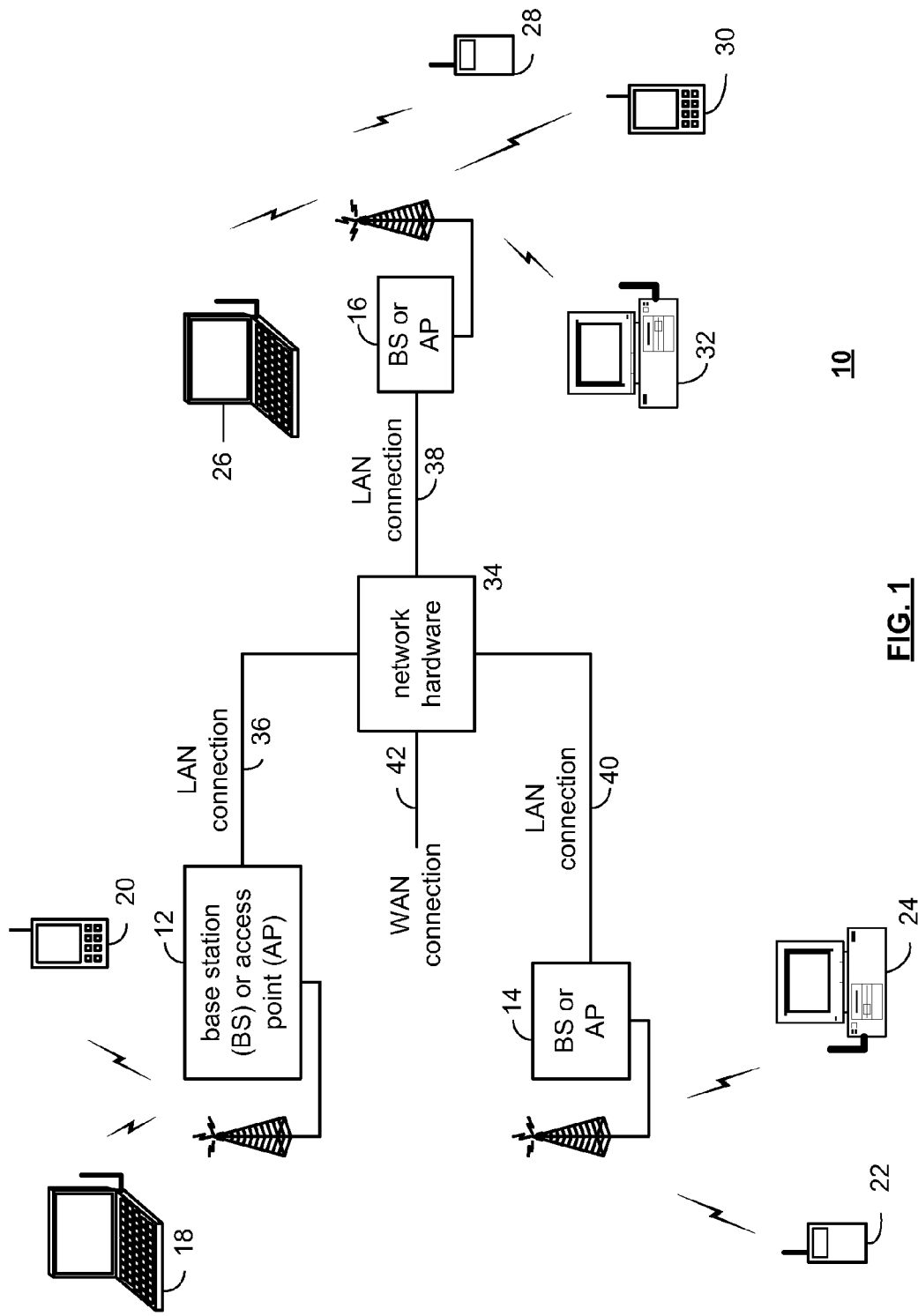
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices is described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication device may operate in accordance with the various aspects of the invention as presented herein to enhance performance, reduce costs, reduce size, and/or enhance broadband applications.

Figure 2:
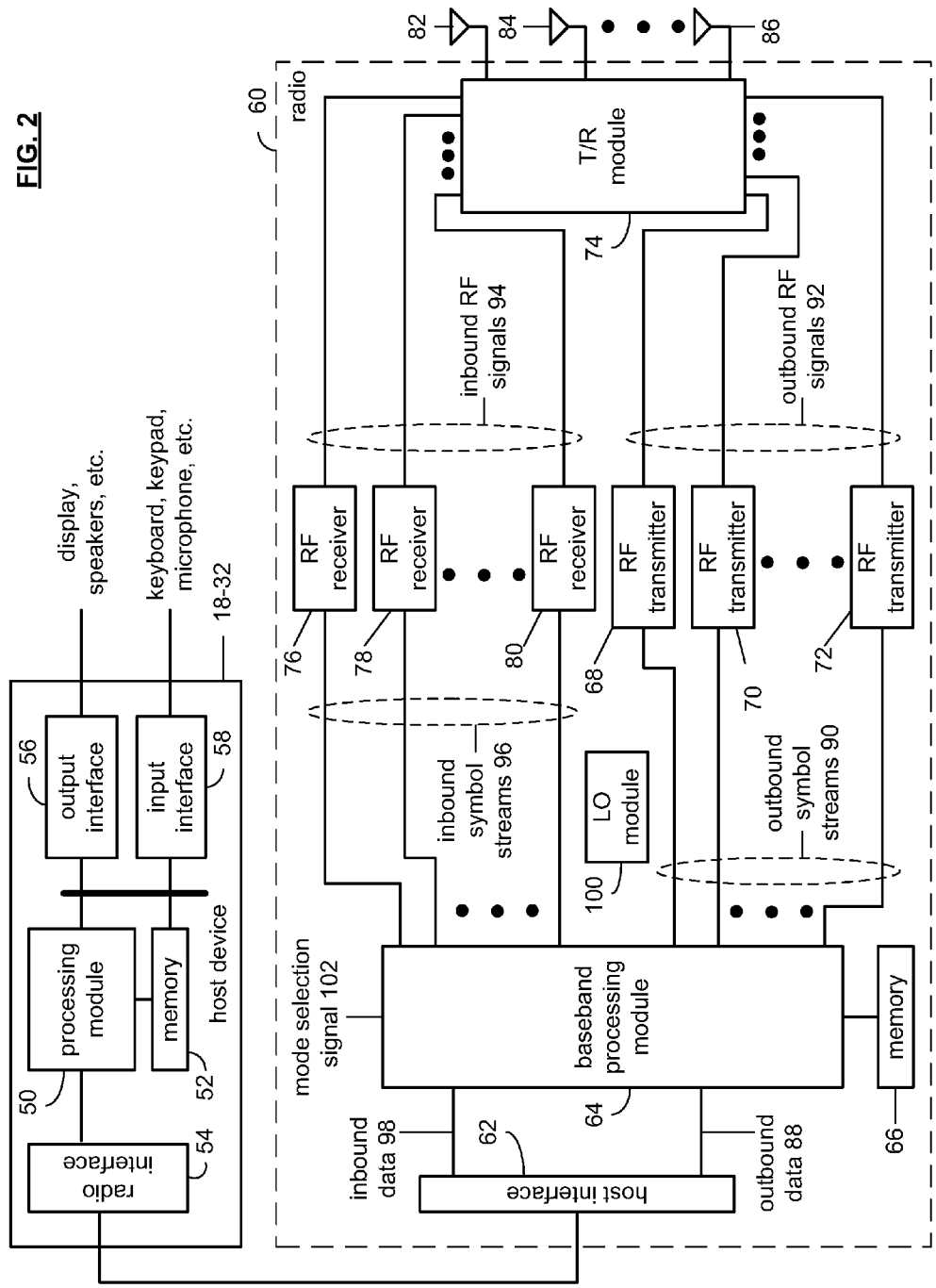
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 60 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10A, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
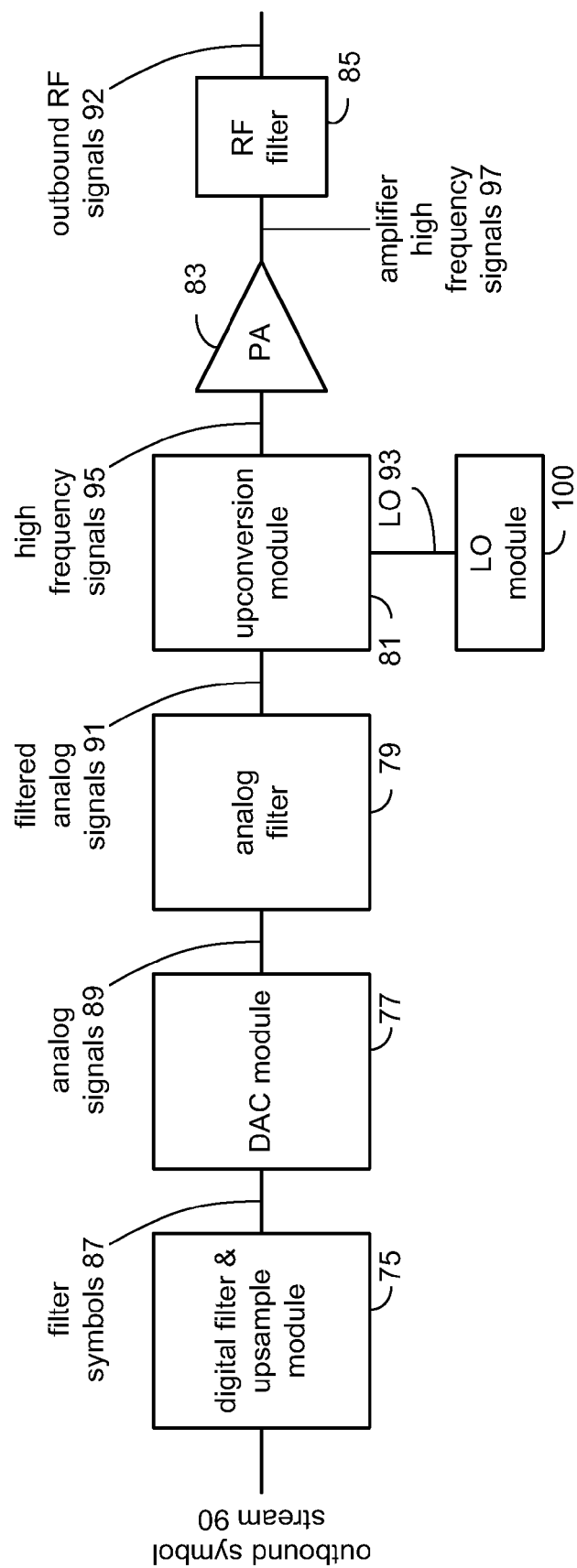
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
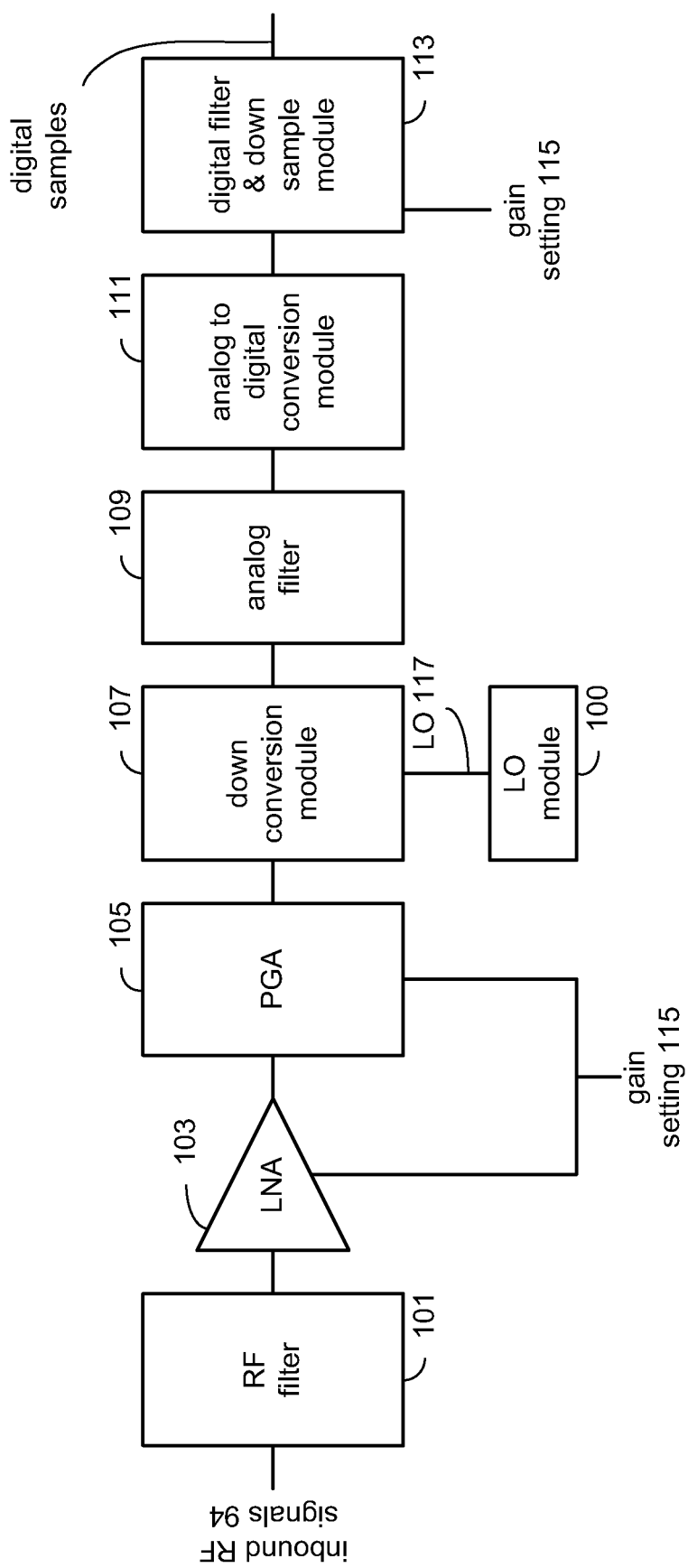
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
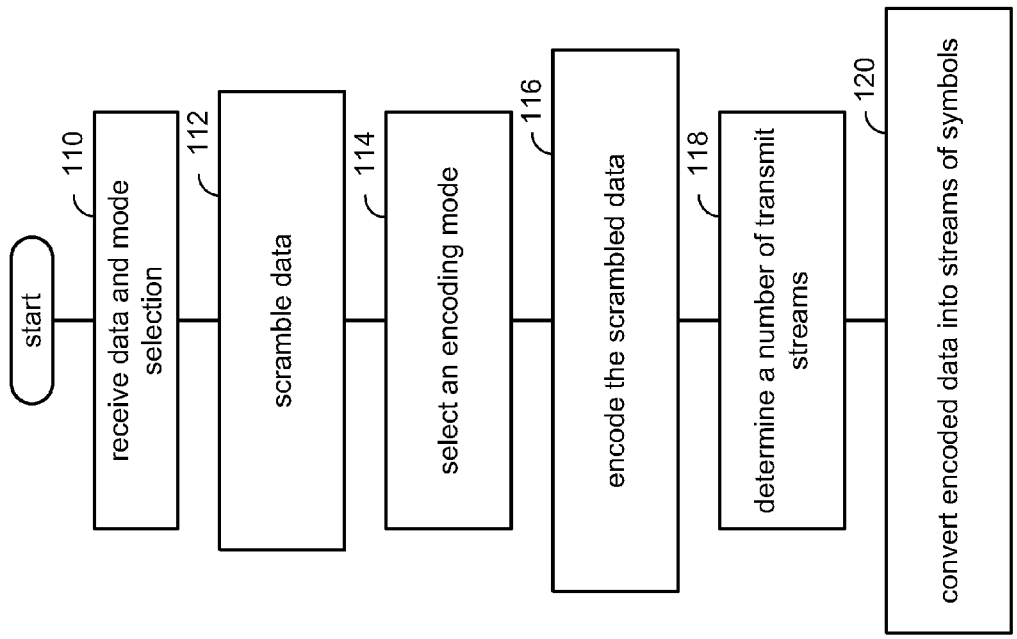
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
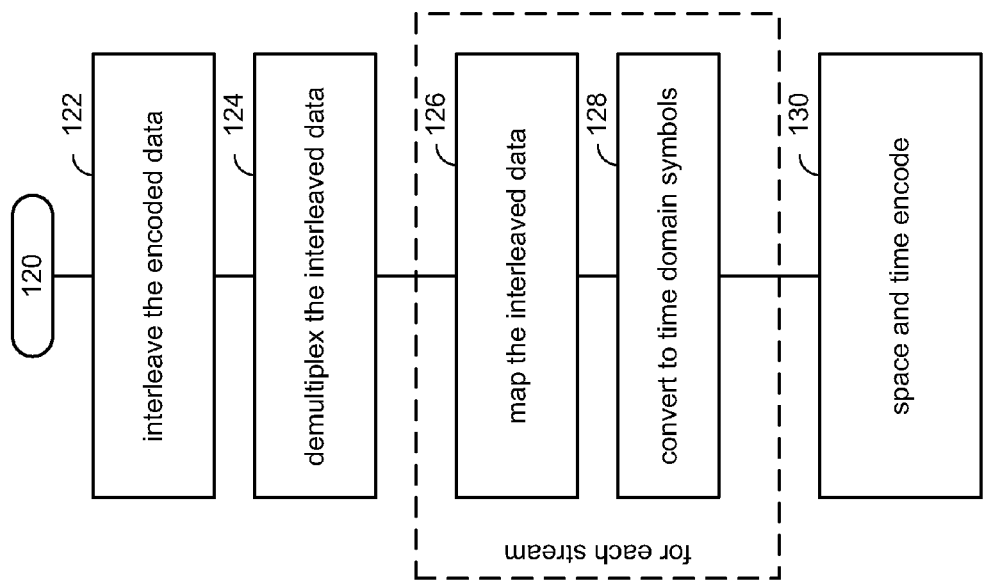
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M In one embodiment the encoding matrix may comprise a form of:

$$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

Figure 9:
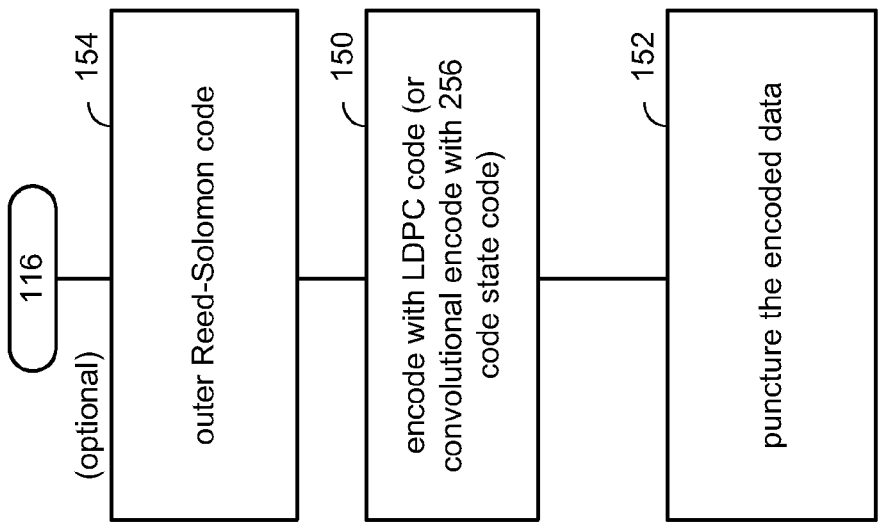
FIGS. 7-9 are diagrams illustrating various embodiments for encoding the scrambled data.
Figure 8:
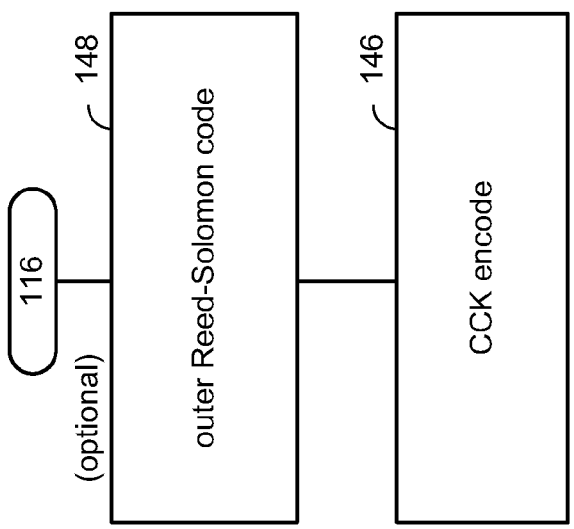
Figure 7:
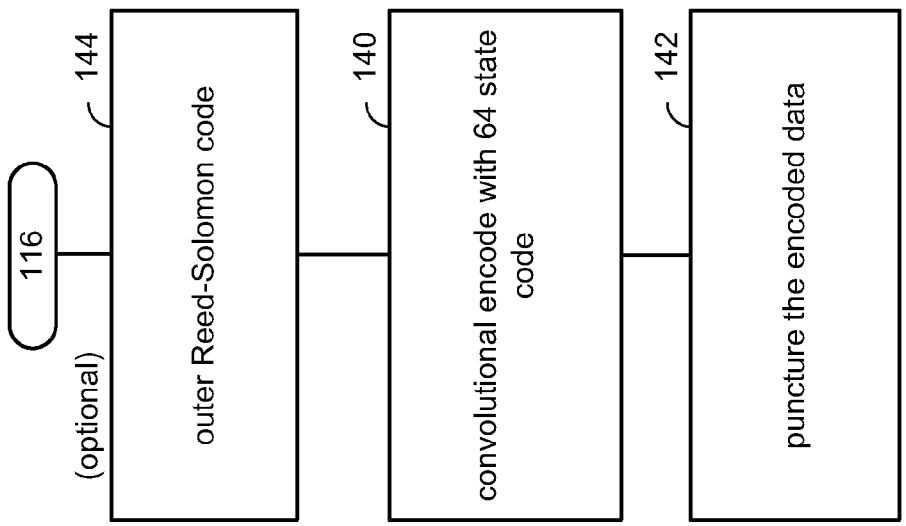

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔ and/or ¾, or any rate as specified in tables 1-12. Note that, for a particular mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
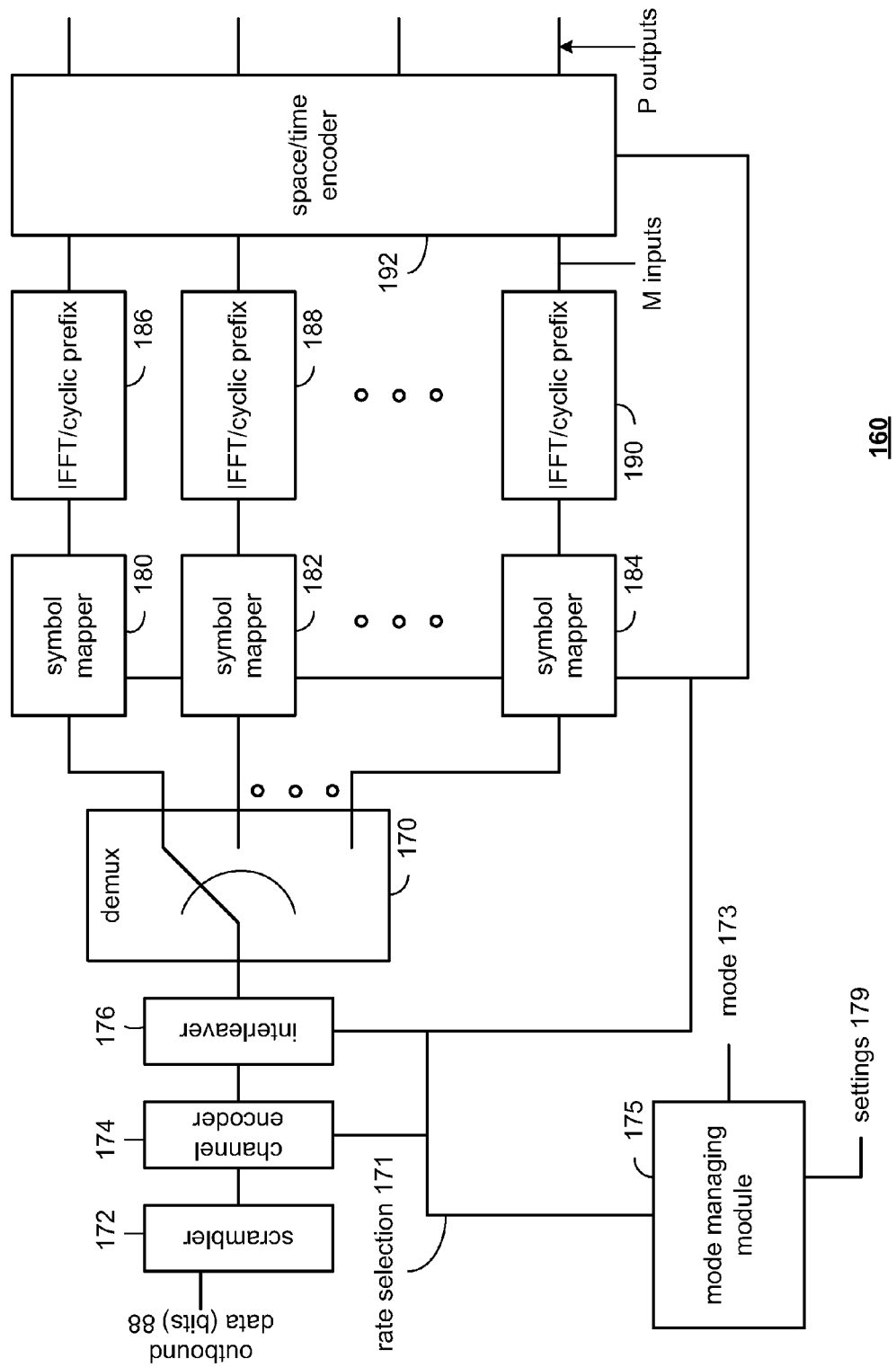
FIGS. 10A and 10A are diagrams illustrating embodiments of a radio transmitter.

FIGS. 10A and 10A are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 178, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleave 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔, and ¾ according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 178 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} c_1 & c_2 & c_3 & c_4 & \ldots & c_{2M-1} & c_{2M} \\ -c_2^* & c_1^* & -c_4^* & c_3^* & \ldots & -c_{2M}^* & c_{2M-1}^* \end{bmatrix}.$$

The rows of the encoding matrix correspond to the number of input paths and the columns correspond to the number of output paths.

Figure 10B:
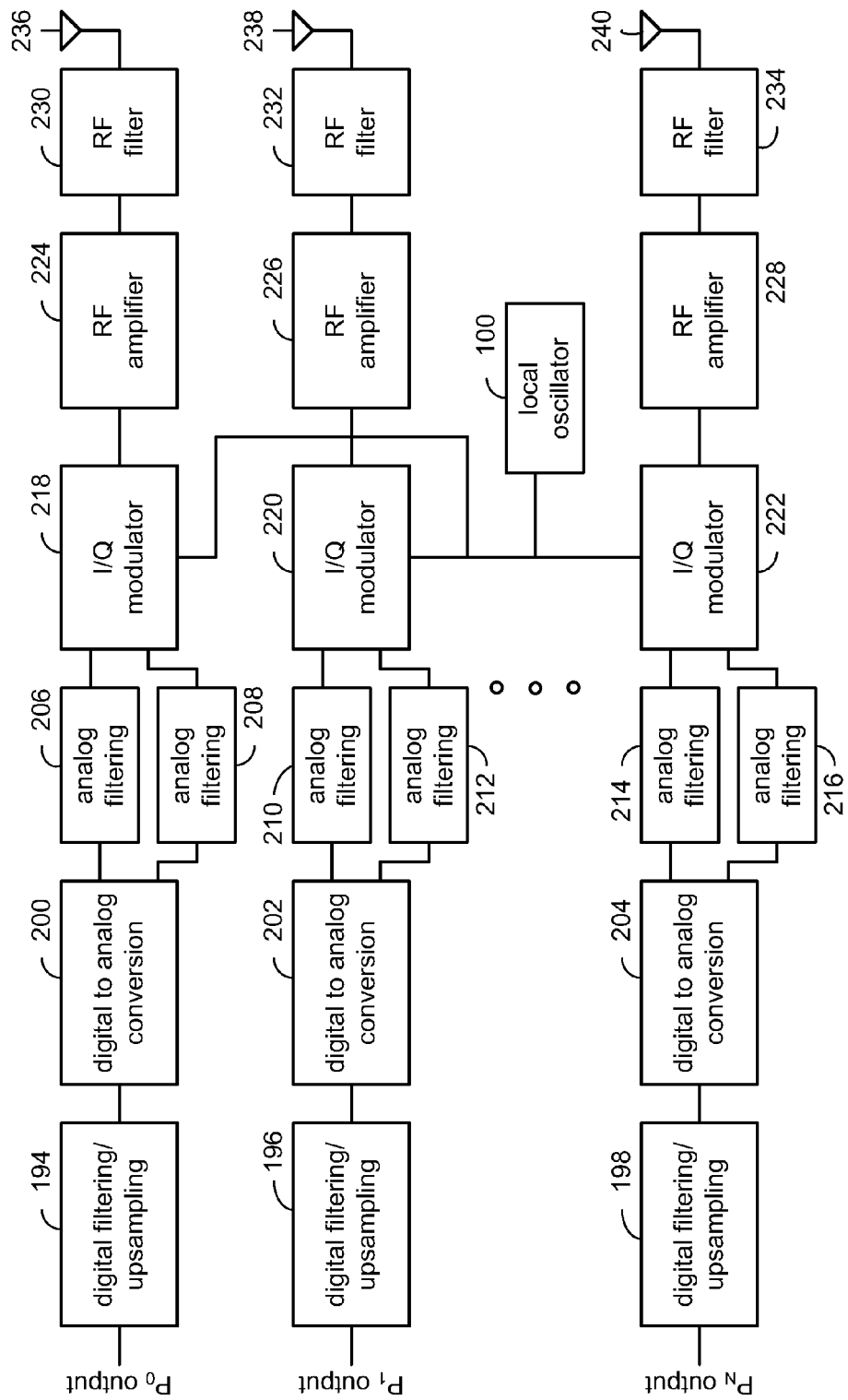

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 208-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
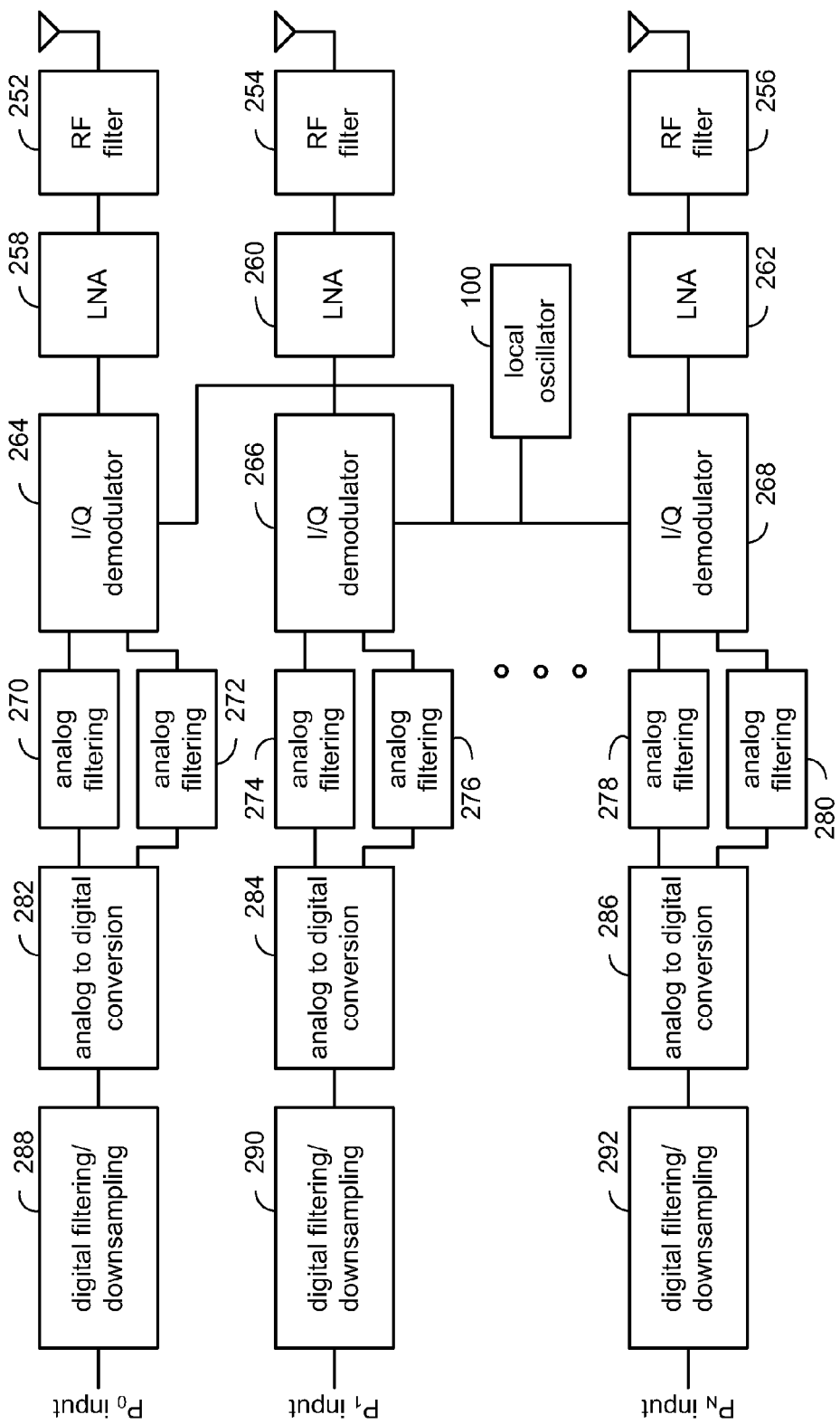
FIGS. 11A and 11A are diagrams illustrating embodiments of a radio receiver.

FIGS. 11A and 11A are diagrams illustrating embodiments of a radio receiver. These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-260, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-260 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

Figure 11B:
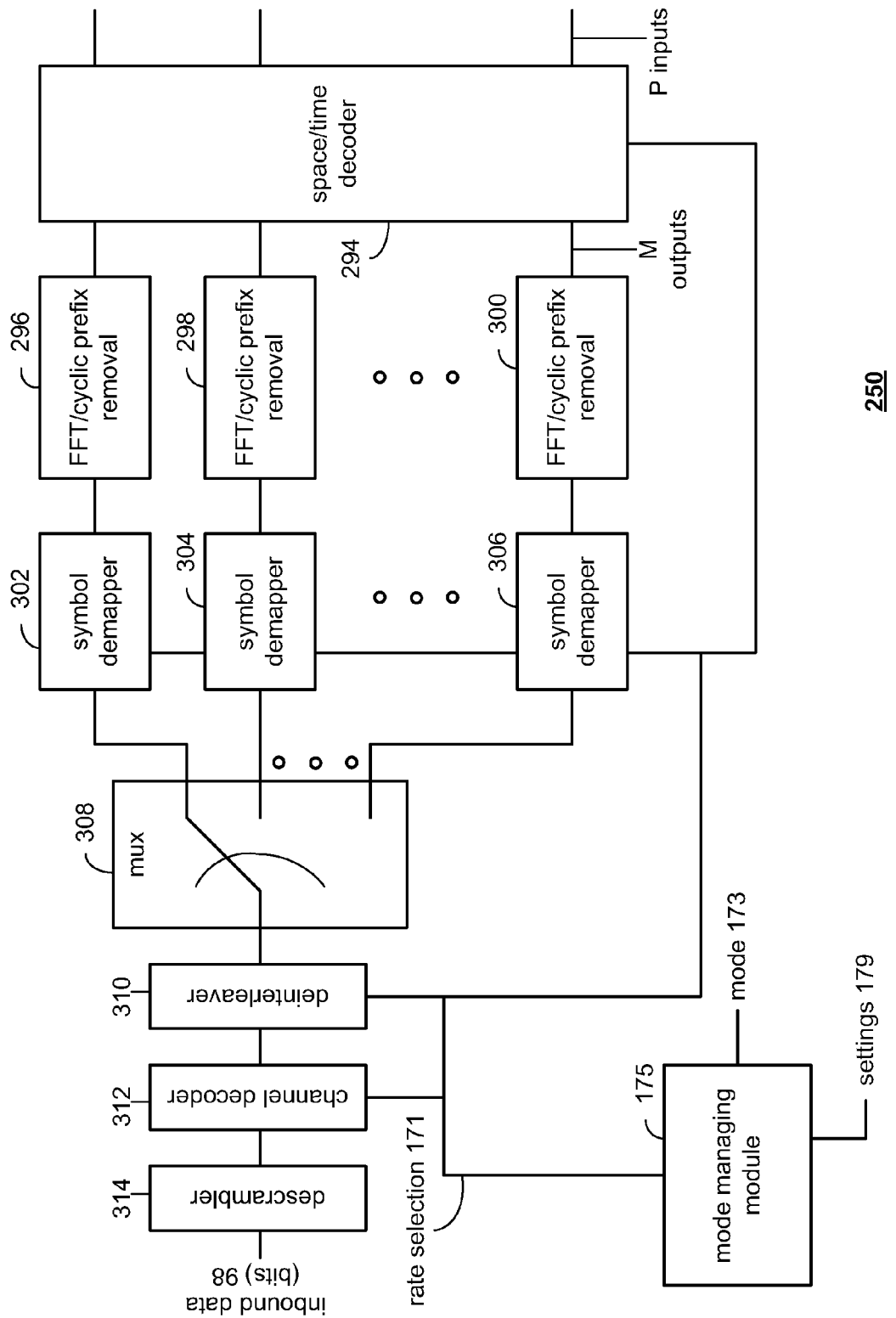

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
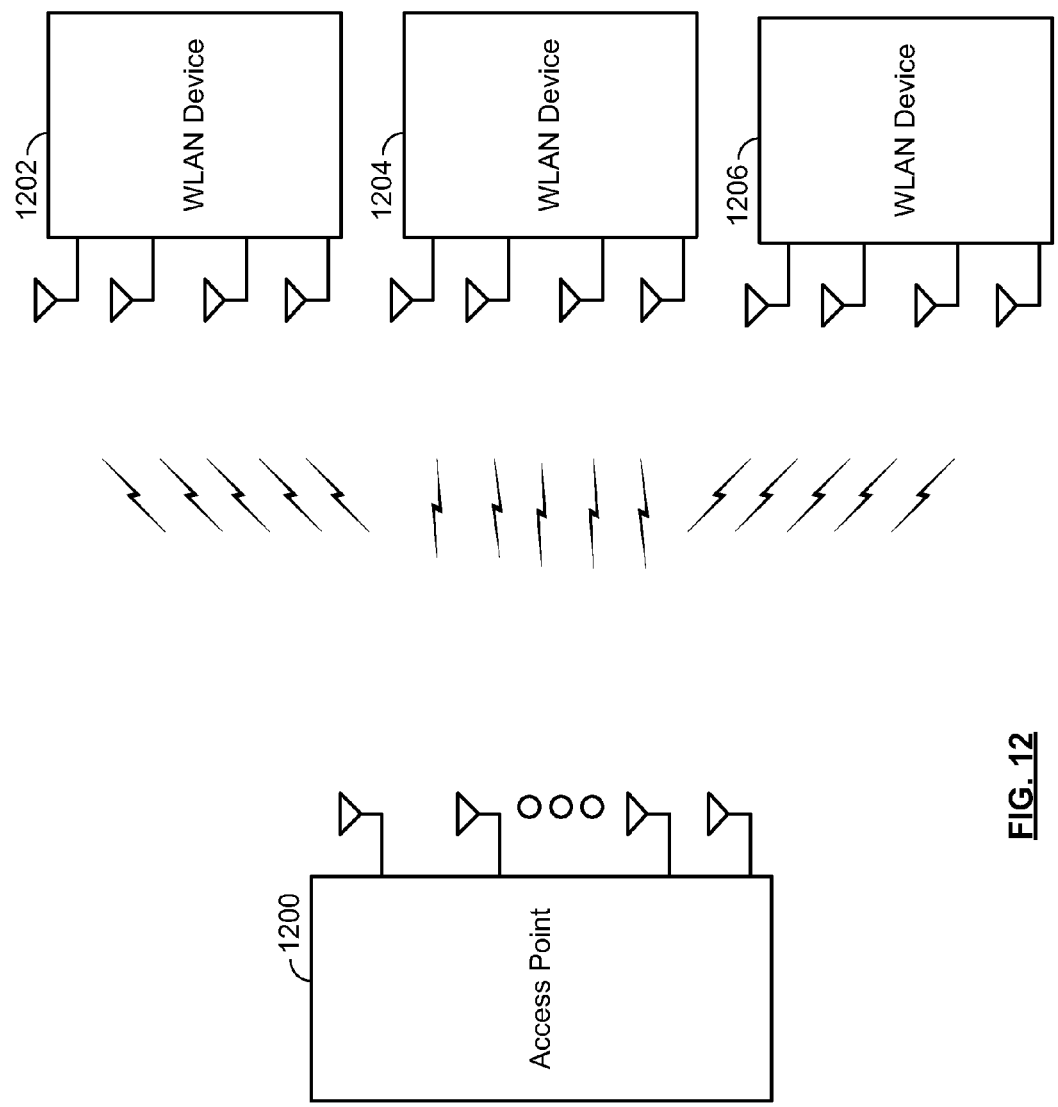
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x (e.g., where x may be a, b, g, n, etc.) standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11 (a), (b), (g), and (n) operating standards. In supporting such backwards compatibility, these devices support signal formats and structures that are consistent with these prior operating standards.

Figure 13:
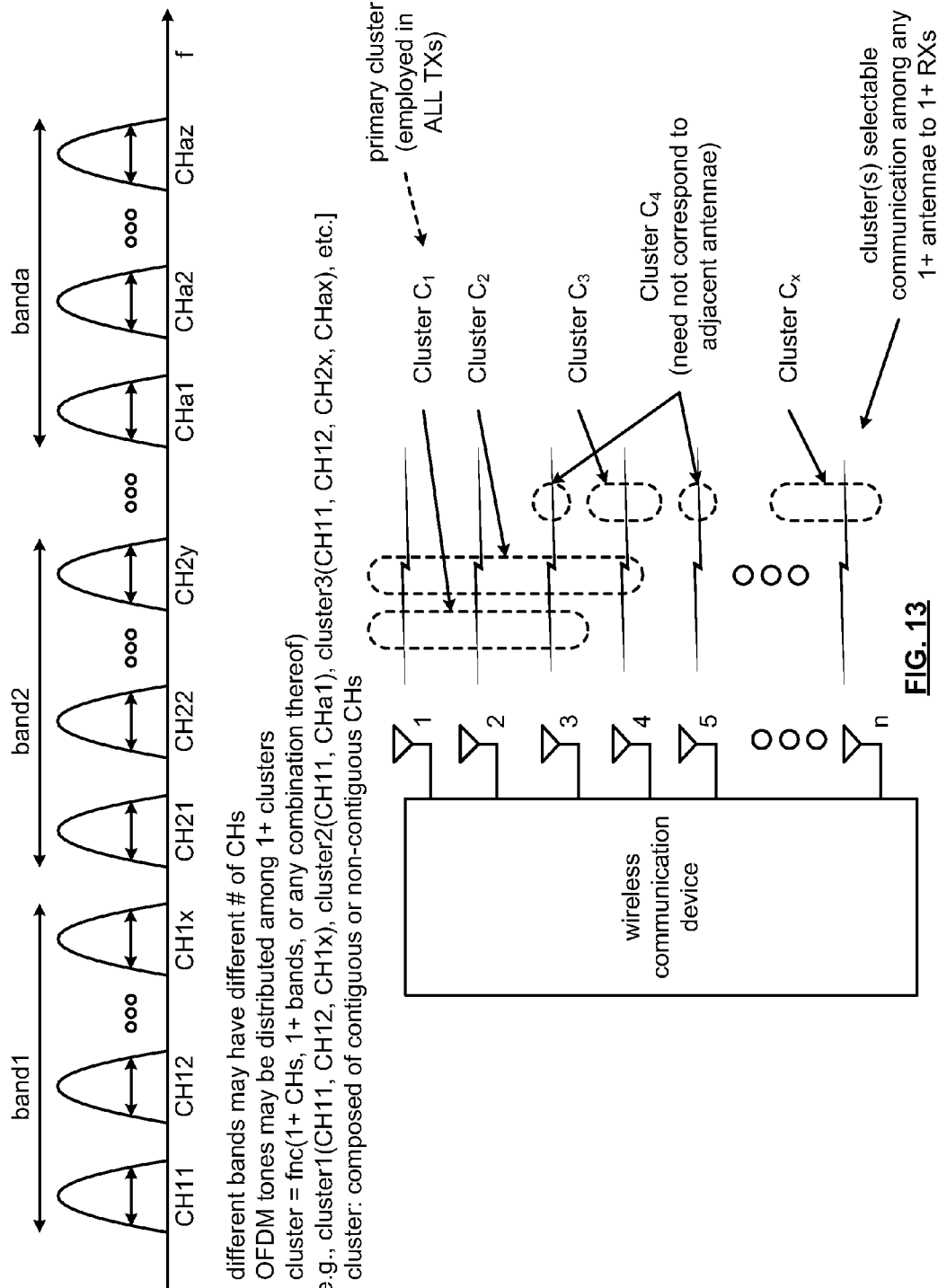
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands. As may be seen in the diagram, any respective cluster may be associated with any one or more antennae (including as few as one antenna as well as up to all of the antennae) of the wireless communication device.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Within the various diagrams and embodiments described and depicted herein, wireless communication devices may generally be referred to as WDEVs. It is noted that such wireless communication devices may be wireless stations (STAs), access points (APs), or any other type of wireless communication device without departing from the scope and spirit of the invention. Generally speaking, wireless communication devices that are APs may be referred to as transmitting wireless communication devices, and wireless communication devices that are STAs may be referred to as receiving wireless communication devices in certain contexts.

Of course, it is noted that the general nomenclature employed herein wherein a transmitting wireless communication device (e.g., such as being an AP, or a STA operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications. Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system.

Figure 14:
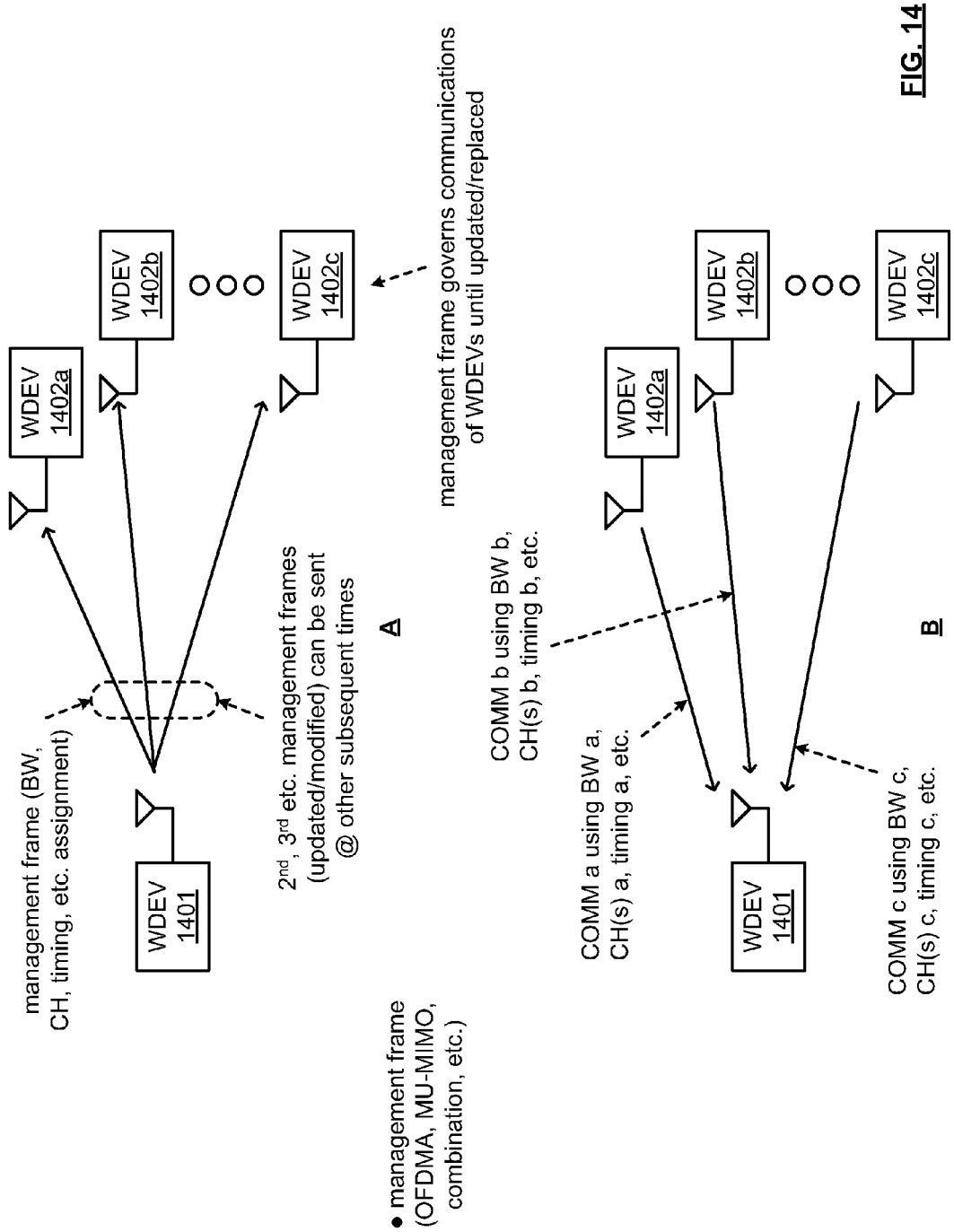
FIG. 14 is a diagram illustrating an embodiment of communications between various wireless communication devices within a communication system.

FIG. 14 is a diagram illustrating an embodiment of communications between various wireless communication devices within a communication system. Within this diagram, wireless communication device 1401 is operative to perform transmitting of a management frame to a plurality of wireless communication devices (shown as wireless communication devices 1402a, 1402b, 1402c, etc.) via one or more antennae of the wireless communication device 1401. The management frame includes successive channel reservation assignment for communications as may be made between various wireless communication devices within a communication system. The successive channel reservation assignment indicate one or more channels (e.g., as few as one channel, any combination of channels including any desired subset of channel within any one or more clusters, etc.) for use in respective communications between various wireless communication devices within a communication system.

In one embodiment, the successive channel reservation assignment of the management frame may indicate a first channel or channels for use in communications by one of the wireless communication devices 1402a-1402c during a first time, and it may also indicate a second channel or channels for use in communications by another one of the wireless communication devices 1402a-1402c during a second time. In another embodiment, the successive channel reservation assignment of the management frame may indicate a first channel or channels for use in communications by one of the wireless communication devices 1402a-1402c during a first time, and it may also indicate a second channel or channels for use in communications by that very same one of the wireless communication devices 1402a-1402c during a second time.

As may be understood with respect to the relationships of clusters, channels, etc. (e.g., such as with respect to FIG. 13), it is noted that much wider bandwidths may be employed for communications between various wireless communication devices. For example, while certain channels may have 20 MHz or 40 MHz, by employing more than one channel for communications, wide bandwidth channels may be composed of multiple of such smaller bandwidth channels (e.g., a bandwidth employed for a given communication may have a bandwidth of any multiple of 20 MHz or 40 MHz). As may be understood as well, a management frame in accordance with the aspects described herein may indicate which channels may be used for a wide bandwidth communication. When more than one channel is employed for a communication, those channels may be contiguous or non-contiguous. In other words, a number of channels each one being adjacent to others within the subset may be employed for a communication, or such non-adjacent/non-contiguous channels may also be employed without departing from the scope and spirit of the invention.

Also, it is noted that a given successive channel reservation assignment, as included within a management frame, may also indicate which channel or channels to use by a subset of wireless communication devices. For example, as also later described with reference to FIG. 16, a subset of wireless communication devices may be given a common instruction/direction regarding the manner by which that subset is to effectuate communications. It is also noted that the management frame may be of any of a variety of types without departing from the scope and spirit of the invention, including a multiple input multiple output (MU-MIMO) packet, an orthogonal frequency division multiple access (OFDMA) packet, a combination OFDMA/MU-MIMO packet, etc.

As seen near the top of the diagram, as depicted by the reference numeral/letter "A", a first management may be firstly transmitted from the wireless communication device 1401 to the wireless communication devices 1401a-1402c. Then, a second management frame may be secondly transmitted from the wireless communication device 1401 to the wireless communication devices 1401a-1402c (e.g., the first management frame may be modified or updated (e.g., as a function of time such as every X number of seconds, after a particular event occurs, and/or based on some other consideration, etc.). The latest received and properly corresponding management frame assignment is employed by the wireless communication devices 1401a-1402c until a new/updated management frame is received.

In some embodiments, it is also noted that a management frame need not be intended for all of the wireless communication devices 1401a-1402c, but a first management frame may be intended for a first subset of the wireless communication devices 1401a-1402c, and a second management frame may be intended for a second subset of the wireless communication devices 1401a-1402c. Various means (e.g., group ID) may be employed within a management frame to indicate for which of the wireless communication devices 1401a-1402c that given management frame corresponds. However, in at least one embodiment, respective management frames (e.g., first, second, etc.) are transmitted to all wireless communication devices within operational range of receiving such management frames. As such, all of the various wireless communication devices should be employing the most recent or current management frame indicating successive channel reservation access for coordinated operation.

It is also noted that various conditions may be assessed to determine the status and availability of various channels before generating a management frame having such successive channel reservation assignment. For example, information related to the current and/or future availability status of one or more channels may be ascertained before generating such a management frame using, at least in part, that information. For example, such operations in accordance with clear channel assessment (CCA) such as in accordance with IEEE 802.11, among other means, may be performed to determine current and/or future availability status of one or more channels that may be employed for communications between various wireless communication devices.

It is also noted that some communication systems and applications may include wireless communication devices of various capabilities. For example, some wireless communication devices may be compliant with an older version of a wireless communication protocol, standard, and/or recommended practice (e.g., being legacy wireless communication devices) such as those that may be compliant with earlier versions of IEEE 802.11x (e.g., where x may be a, b, g, n, etc.). In addition, other certain wireless communication devices may not only be compliant with such legacy communication protocols, standards, and/or recommended practices (e.g., such as IEEE 802.11x as indicated above), but certain wireless communication devices may also be compliant with newer communication protocols, standards, and/or recommended practices such as IEEE 802.11ac, among others. For example, those wireless communication devices compliant with newer communication protocols, standards, and/or recommended practices such as IEEE 802.11ac, among others, are most typically also backward compatible with older version of a wireless communication protocol, standard, and/or recommended practice such as those that may be compliant with earlier versions of IEEE 802.11x as indicated above. As such, in various embodiments described herein, any communication being made can be directed to occupy and use a primary channel (e.g., one that all legacy wireless communication devices can detect) so that all wireless communication devices within an operational vicinity can detect and/or receive such a communication. At a minimum, by using such a primary channel for all communications, all of the wireless communication devices should at least be able to detect that a communication is in fact occurring and stay off of the communication medium (e.g., the air in a wireless communication system).

As may also be understood, such successive channel reservation assignment can include information not only related to one or more channels as may be used by any given wireless communication device for communications, but such successive channel reservation assignment can also include respective timing information related to communications as to be made by various wireless communication devices. For example, when a given channel or channels are employed for communications corresponding to more than one wireless communication device, then information related to a respective order, timing information, etc. associated with those communications may also be included within the successive channel reservation assignment. As may be understood, a first wireless communication device channel may employ a given channel for communication at or during a first time, and then a second wireless communication device channel may employ that same given channel for communication at or during a second time. As may be seen, the successive channel reservation assignment can include multiple types of information including channel assignment, timing information, relative order of communications, etc. without departing from the scope and spirit of the invention.

As seen near the bottom of the diagram, as depicted by the reference numeral/letter "B", based on at least one received management frame (e.g., a latest received management frame), communications of the various wireless communication devices 1402a-1402c are governed thereby. For example, a communication 'a' from wireless communication device 1402a may be made in accordance with a bandwidth 'a', using one or more channels 'a', at a time 'a' and for a respective duration, etc. as defined by the management frame including successive channel reservation assignment therein. Analogously, such respective communications from the other of the wireless communication devices 1402b-1402c are similarly defined and directed by the information within the management frame.

As mentioned elsewhere herein, it is noted that the general nomenclature employed herein wherein a transmitting wireless communication device (e.g., such as being an AP, or a STA operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications. In accordance with such nomenclature, in some embodiments, the wireless communication device 1401 may be an AP, and the respective wireless communication devices (shown as wireless communication devices 1402a, 1402b, 1402c, etc.) may be wireless stations (STAs) operable in accordance with wireless local area networks (WLANs), those compliant with IEEE 802.11, etc.

Figure 15:
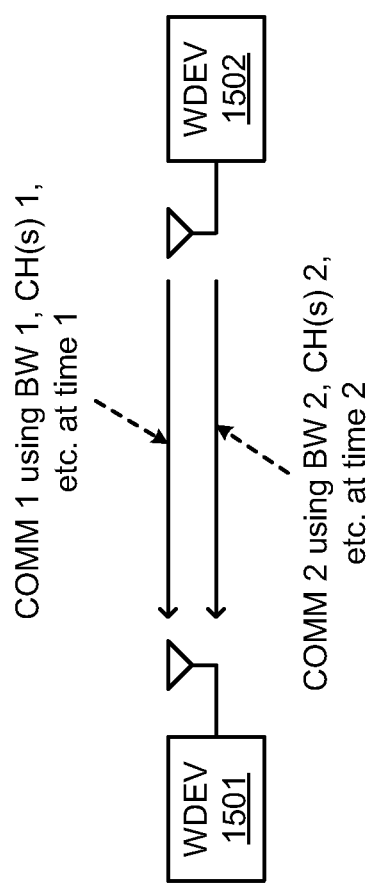
FIG. 15 is a diagram illustrating an alternative embodiment of communications between various wireless communication devices within a communication system.

FIG. 15 is a diagram illustrating an alternative embodiment of communications between various wireless communication devices within a communication system. In this embodiment, based on a management frame (e.g., such as provided from the wireless communication device 1501 or another wireless communication device, not shown), a communication '1' from wireless communication device 1502 may be made in accordance with a bandwidth '1, using one or more channels '1', at a time '1' and for a respective duration, etc. as defined by the management frame, and then a communication '2' from wireless communication device 1502 may be made in accordance with a bandwidth '2, using one or more channels '2', at a time '2' and for a respective duration, etc. as defined by the management frame. As may be seen, based on the successive channel reservation assignment of a management frame, a first one or more operational parameters may be used for communication by the wireless communication device 1502 during a first time, and a second one or more operational parameters may be used for communication by the wireless communication device 1502 during a second time.

Figure 16:
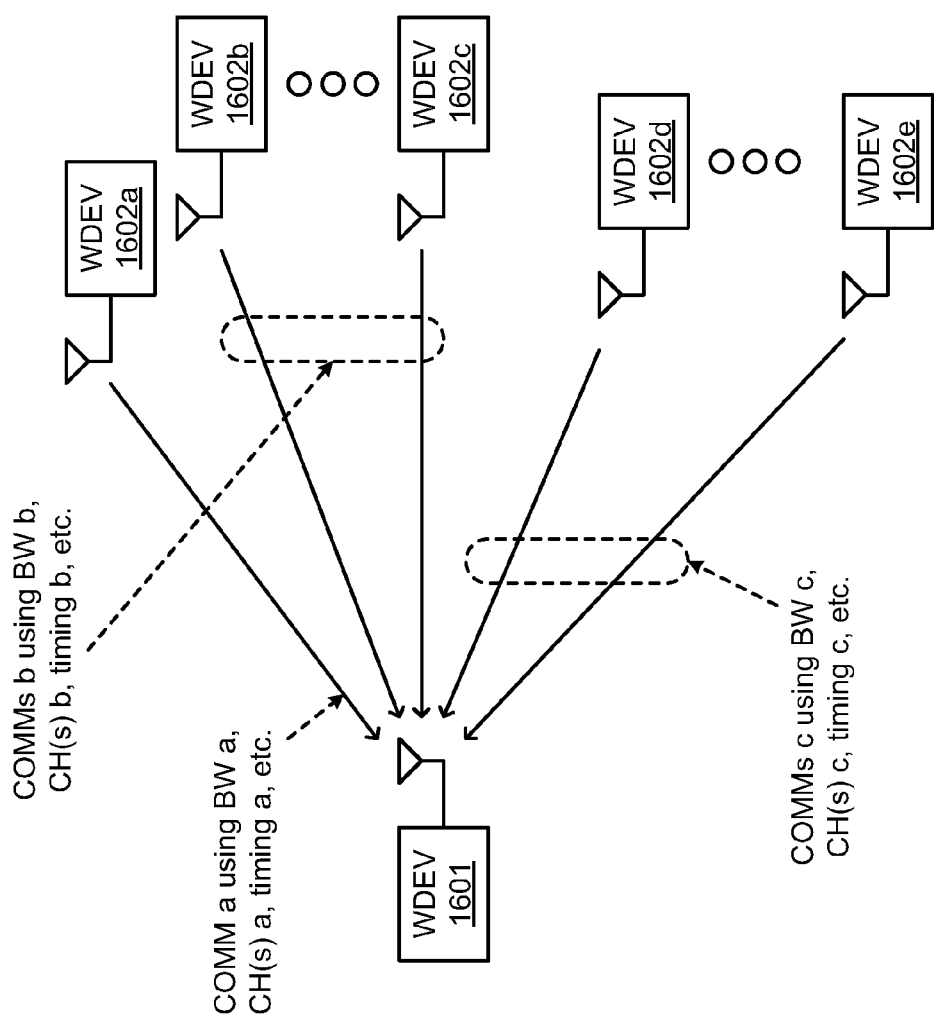
FIG. 16 is a diagram illustrating yet another alternative embodiment of communications between various wireless communication devices within a communication system.

FIG. 16 is a diagram illustrating yet another alternative embodiment of communications between various wireless communication devices within a communication system. In this embodiment, based on a management frame (e.g., such as provided from the wireless communication device 1601 or another wireless communication device, not shown), a communication 'a' from wireless communication device 1602a may be made in accordance with a bandwidth 'a', using one or more channels 'a', at a time 'a' and for a respective duration, etc. as defined by the management frame. Also, communications from a first subset of wireless communication devices 1602b-1602c may be made in accordance with a bandwidth 'b', using one or more channels 'b', at a time 'b' and for a respective duration, etc. as defined by the management frame, and communications from a second subset of wireless communication devices 1602d-1602e may be made in accordance with a bandwidth 'c', using one or more channels 'c', at a time 'c' and for a respective duration, etc. as defined by the management frame.

For a subset of wireless communication devices communicates to the wireless communication device 1601, the wireless communication device 1601 may have capability to receive multiple communications simultaneously. Alternatively, if the wireless communication device 1601 does not have capability to receive multiple communications simultaneously, then respective timing information of communications from those wireless communication devices within a given subset may also be included within the management frame (e.g., when a common one or more channels are employed for communications from more than one wireless communication device, then respective timing information may be included to ensure that such communications may be made without interfering with one another).

Figure 17:
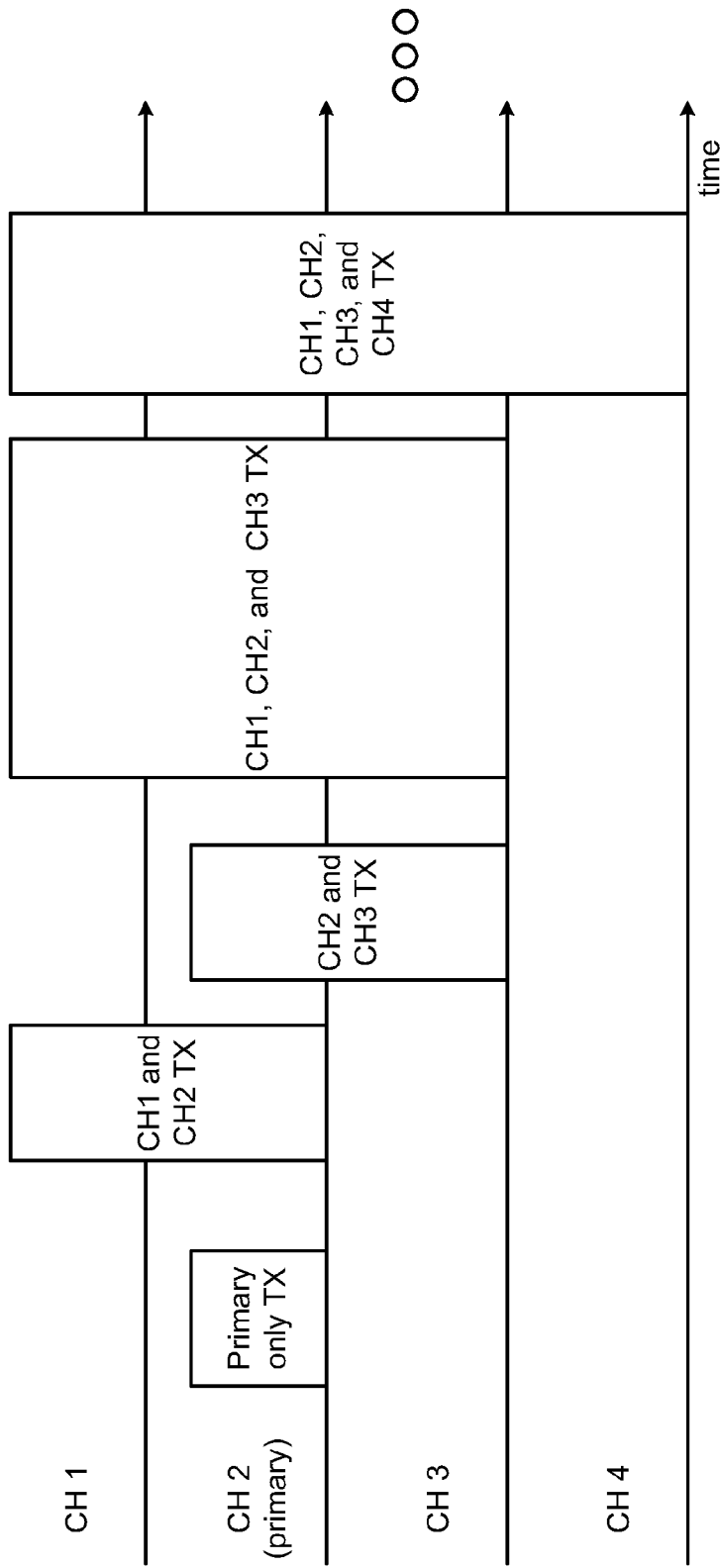
FIG. 17 is a diagram illustrating an embodiment of a timing diagram showing communications between various wireless communication devices.

FIG. 17 is a diagram illustrating an embodiment of a timing diagram showing communications between various wireless communication devices. As mentioned elsewhere herein, with respect to the channel assignment (e.g., including primary channel assignment), a relatively wider bandwidth (BW) channel may be defined and employed that consists of multiples of relatively smaller bandwidth channels (e.g., being multiples of 20 MHz or 40 MHz individual channels). As such, by effectively combining more than one individual channel, wide bandwidth communications may be effectuated between various wireless communication devices.

As also described herein, a management frame may be used to indicate which channels may be used for such wide bandwidth communications (e.g., a management frame that includes successive channel reservation assignment). In accordance with such successive channel reservation assignment, each respective channel indicated may represent a particular bandwidth (e.g., 20 MHz or 40 MHz bandwidth individual channels). At least one of these channels is assigned by management frames on a semi-static basis. Of course, the channel assignment may be modified or updated (e.g., as a function of time such as every X number of seconds, after a particular event occurs, as traffic/interference conditions change, and/or based on some other consideration, etc.). For example, if traffic conditions change, the respective set of channels and total bandwidth available for use in communications may be modified/updated using the management frame.

During the packet transmission (instantaneous) to various receiving wireless communication devices (e.g., STAs), a subset of channels originally assigned by the management frame may be used. That is to say, such operation may operate using a subset of those channels previously defined by a management frame. For example, based on a given channel assignment, channels x, y, and z may be permitted for use in a communication. However, for some reason, one of those channels (e.g., channel x) may not be available for communication, and the other channels within the assignment may be employed (e.g., the communication can be performed using channels y and z). For example, in such an embodiment, an instantaneous channel assignment may depend on the communication traffic/interference conditions. Also, before commencing a given communication, carrier sense or energy detection may be performed to avoid collisions and to ensure that an occupied channel is not used in a communication.

As mentioned elsewhere herein, within a given application, some wireless communication devices may be compliant with an older version of a wireless communication protocol, standard, and/or recommended practice (e.g., being legacy wireless communication devices) such as those that may be compliant with earlier versions of IEEE 802.11x (where x may be a, b, g, n, etc.), and other wireless communication devices may not only be compliant with such legacy communication protocols, standards, and/or recommended practices, but may also be compliant with newer communication protocols, standards, and/or recommended practices such as IEEE 802.11ac, among others.

As such, when operating in an application that includes wireless communication devices of varying and different capabilities, a non-contiguous bit may be defined in a management frame that includes successive channel reservation assignment or other management or control frames (e.g., such a non-contiguous bit need not necessarily be related to successive channel reservation assignment and may be employed for other uses). Such a non-contiguous bit may be signaled in the device capabilities field of a management frame. Because various wireless communication devices have different capabilities, some of the wireless communication devices may be able to receive/transmit contiguous bandwidth communications only. In such an embodiment, channels used for transmission/reception may all be adjacent to each other without unused channels interposed there between. Such an indication may be made by setting the non-contiguous=0.

Also, because various wireless communication devices may have different capabilities, while most (if not all) of the wireless communication devices may be able to receive/transmit both contiguous and non-contiguous bandwidth communications, some may only be able to contiguous bandwidth communications. As may be understood, channels used for transmission/reception may not be adjacent to each other in all instances (e.g., unused channels may be interposed between those channels being used). Such an indication may be made by setting the non-contiguous=1.

As mentioned elsewhere herein in regards to employing a primary channel for all communications, a contiguous capability embodiment is employed as an example (e.g., non-contiguous=0). In such an embodiment, each respective communication shall include the primary channel and may also include one or more channels adjacent to it (e.g., channels used for transmission/reception may all be adjacent to each other without unused channels interposed there between). An example is provided below for the convenience of the reader. If a primary channel is defined as being channel 2 out of channels 1, 2, 3, and 4 signaled by the management frame (e.g., such as using management frames transmitted on the semi-static basis), then an instantaneous transmission may include any one of the following:

Only primary channel (2)
Primary channel and channel below primary (i.e., 1 and 2)
Primary channel and channel above primary (i.e., 2, 3)
Primary channel and channels above and/or bellow primary (i.e., 1, 2, 3 or 2, 3, 4)
Primary and three more channels (i.e., 1, 2, 3, and 4)

Of course, it is noted that the above described principle may be easily extended to an embodiment with more channels (e.g., more than 4 channels). Generally speaking, such principles can be applied to an embodiment with N channels, where N is any desired integer greater than 1.

It is noted that, since a primary channel can be employed in all communications, the placement of the primary channel among the channels being employed may be intelligently made so as to provide greater options with respect to channel combinations. For example, when the primary channel is placed at a band edge (e.g., such as being channel 1 or 4 in the embodiment of FIG. 17), there are fewer options for combining/employing adjacent channels in a respective communication (e.g., within a given band, combinations of adjacent channels may be extended in only one direction away from that band-edge placed primary channel). However, when the primary channel is placed in one of the middle channels away from the band edge (e.g., such as being channel 2 or 3 in the embodiment of FIG. 17), more options of combined/adjacent channels may be employed for communications that include that primary channel (e.g., within a given band, combinations of adjacent channels may be extended in both directions away from that more centrally placed primary channel).

Referring again to the embodiment of FIG. 17, this diagram may be viewed as being a contiguous capability embodiment (e.g., non-contiguous=0). As may be seen, any given communication operates using one or more channels, and when a communication operates using two or more channels, those channels are contiguous or adjacent to one other (e.g., channels used for transmission/reception may all be adjacent to each other without unused channels interposed there between). Also, as can be seen, the channel assignment also includes timing relationship between the respective communications. For example, a communication using the primary channel 2 is firstly performed (and having a respective duration), then a communication using the primary channel 2 and the adjacent channel 1 is secondly performed (and having a respective duration), then a communication using the primary channel 2 and the adjacent channel 3 is thirdly performed (and having a respective duration), and so on as depicted in the diagram.

Figure 18:
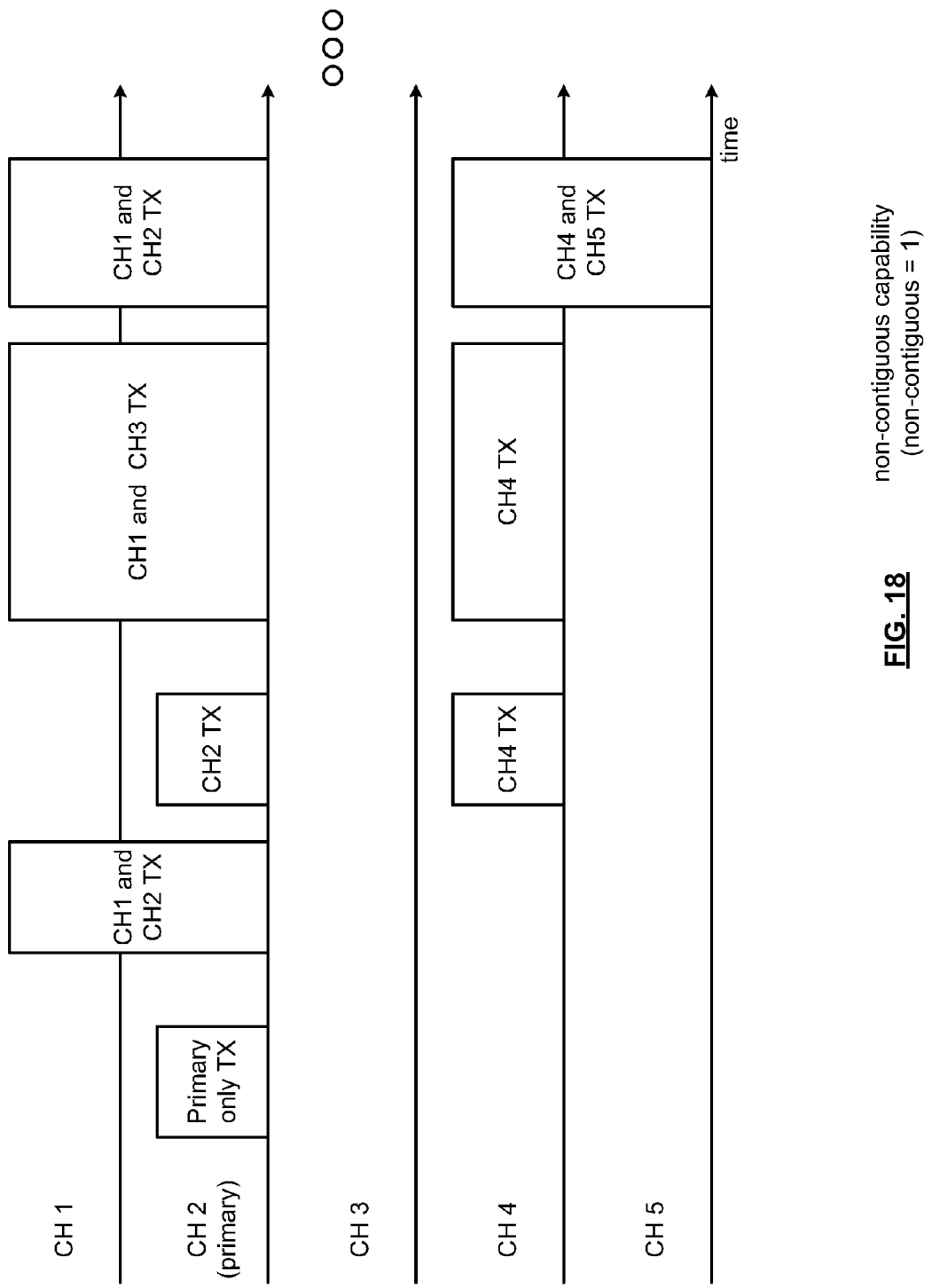
FIG. 18 is a diagram illustrating an alternative embodiment of a timing diagram showing communications between various wireless communication devices.

FIG. 18 is a diagram illustrating an alternative embodiment of a timing diagram showing communications between various wireless communication devices. In an embodiment in which non-contiguous channels are assigned/communicated in the management frame exchange, then non-contiguous channels may consists of M groups of at least one channel per group. In accordance with such non-adjacent/non-contiguous channel assignment, there may be unused channels between any two groups that do not have another group in between them. In such a non-adjacent/non-contiguous embodiment, each of the M groups of channels is contiguous (e.g., there are no additional unused channels within any of the groups).

In accordance with the use of a primary channel (e.g., channel 2) for all communications, each respective communication shall include the primary channel (e.g., channel 2) and may include channels that may not be all adjacent to each other (e.g., there may exist unused channels interposed there between). An example is provided below for the convenience of the reader. If a primary channel is defined as being channel 2 out of channels 1, 2, 3, 4, and 5 signaled by the management frame (e.g., such as using management frames transmitted on the semi-static basis), then an instantaneous transmission may include any one of the following:

Only primary channel 2

Primary channel and channel below primary (e.g., 1 and 2)

Primary channel and channel above primary (e.g., 2 and 4 or 2 and 5)

Primary channel and channels above and/or bellow primary (e.g., 1, 2, and 4 or 1, 2, and 5 or 2, 4, and 5)

Primary and three more channels (e.g., 1, 2, 4, and 5)

Analogously as mentioned above with respect to another embodiment, it is noted that the above described principle may be easily extended to an embodiment with many more groups of non-contiguous channels. Generally speaking, there may be many unused channels in between non-contiguous groups of channels. For example, considering this example provided above, it is channel 3 (unused channel) in between the 2 non-contiguous groups of channels.

Depending on the non-contiguous bit indication or definition in the capabilities field of a management frame, the management frame may assign contiguous or non-contiguous channels for transmission/reception for different, respective users. It is also noted that the non-contiguous capability and a number of spatial streams supported by various wireless communication devices are inherently related. For example, a given embodiment may include 2 non-contiguous channels with 1 stream or 1 channel with 2 spatial streams. That is to say, a given wireless communication device may not be able to support both 2 streams and 2 non-contiguous channels in the same time.

With respect to commencing a communications (e.g., transmissions/receptions), a given wireless communication device may transmit on all channels indicated by the management frame if it is (instantaneously) determined that those channels are not occupied (e.g., such as in accordance with a clear channel assessment (CCA) operation). That is to say, given a particular channel assignment, a CCA operation may nonetheless be performed before commencing a communication on the one or more channels of that channel assignment to identify which of those one or more channels are currently available (e.g., in spite of the particular channel assignment). For example, a given wireless communication device may transmit on a subset of channels originally assigned by the management frame (e.g., those one or more channels of a given channel assignment) that are not occupied if spectrum mask requirements can be met.

As may be understood, a given management frame may indicates larger set of channels in accordance with its channel assignment. The bandwidth (e.g., a subset of those channels) may be indicated in the VHT-SIG field of a packet. The reception success of a given communication depends on the interference conditions since receiver filters may be wide. That is to say, filters and reception within a wireless communication device may be set for channels indicated by the management frame (e.g., the latest management frame).

On-the-fly (e.g., real time) filter adjustment may involve relatively complex issues (e.g., DC offset, transients, local oscillator (LO) feed through, etc.). In such a case, a receiving wireless communication device may monitor the primary channel only (e.g., such as with a 20 MHz filter bandwidth) and then the filters and reception may be adjusted for a different bandwidth (subset of channels) as indicated in the VHT-SIG field of a packet. Filter adjustment and reception may be performed right after the VHT-SIG field (e.g., such as within FIG. 19).

Referring again to the embodiment of FIG. 18, this diagram may be viewed as being a contiguous capability embodiment (e.g., non-contiguous=1). As may be seen, any given communication operates using one or more channels, and when a communication operates using two or more channels, those channels need not necessarily be contiguous or adjacent to one other (e.g., channels used for transmission/reception may selected and grouped together such that there may be unused channels interposed there between). Also, as can be seen, the channel assignment also includes timing relationship between the respective communications. For example, a communication using the primary channel 2 is firstly performed (and having a respective duration), then a communication using the primary channel 2 and the adjacent channel 1 is secondly performed (and having a respective duration), then a communication using the primary channel 2 and the non-adjacent/non-contiguous channel 3 is thirdly performed (and having a respective duration), and so on as depicted in the diagram.

Figure 19:
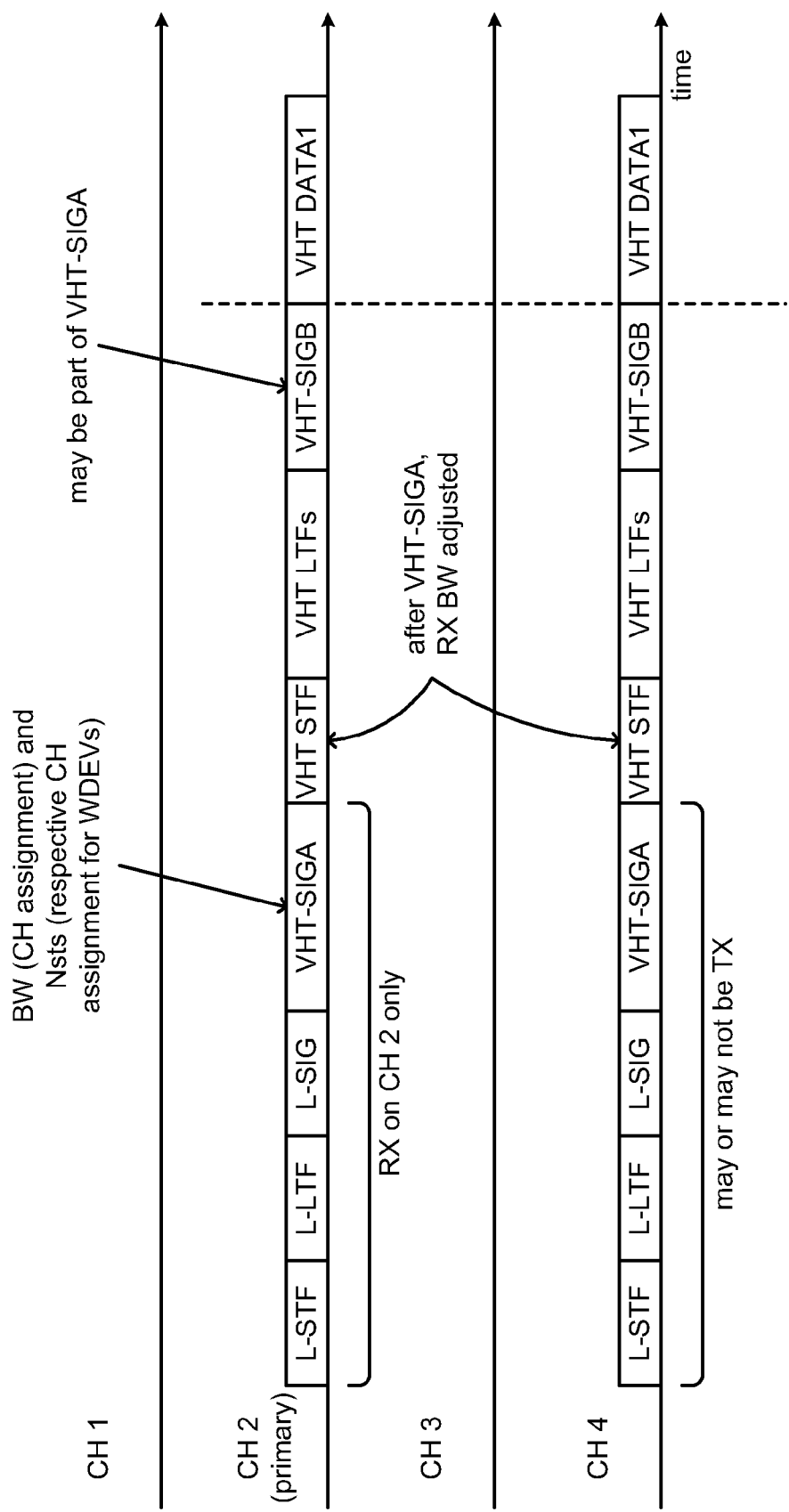
FIG. 19 is a diagram illustrating an embodiment of a communications being made using a subset of channels.

FIG. 19 is a diagram illustrating an embodiment of a communications being made using a subset of channels. Packet construction in accordance with the various principles presented herein, generally speaking, may include a preamble, a signal field, and a payload. Generally, the preamble is used for carrier acquisition, synchronization, channel estimation, etc. The signal field is used to communicate frame specific parameters (e.g., coding rate, frame length, etc.) to a receiving device. The payload is the data portion of the packet.

A frame format may be modified based on a number of parameters, including, dependence upon the presence of other wireless communication devices in a communication system. In some instances, a communication may include various types of wireless communication devices having different respective capability sets (e.g., legacy devices, newer devices, mixed mode devices, etc.).

For example, with some embodiments, in the 5 GHz spectrum, legacy devices may include those being compliant in accordance with IEEE 802.11a and IEEE 802.11n, among others. Legacy devices must be able to recognize a packet has been transmitted and remain off the air for the duration of the packet (i.e., remain off of the communication channel or communication medium giving access to other communication devices). Thus, packets formed in accordance with the various aspects presented herein may include certain portions therein that are compliant with legacy or prior standards, recommended practices, etc. As one example, a new packet may include a legacy preamble and a signal field along with a new, modified version of a payload. With such a novel packet structure, a legacy device will still be able to recognize the legacy preamble and decode the legacy signal field. The legacy signal field contains information that tells the legacy devices how long the packet will be on the air (i.e., occupy or be using the communication channel or communication medium). The legacy signal field does not contain IEEE 802.11ac specific parameters (that is done in the IEEE 802.11ac signal field).

Referring to FIG. 19, the preamble includes a legacy short training field (L-STF), a legacy long training field (L-LTF), a legacy signal field (L-SIG), at least one (e.g., a first) very high throughput signal field (VHT-SIGA), a very high throughput short training field (VHT-STF), at least one very high throughput long training field (VHT-LTF), a second very high throughput signal field (VHT-SIGB), followed by a data field (VHT DATA). As mentioned elsewhere with respect to at least one other embodiment, filters and reception of wireless communication device may be adjusted for a different bandwidth (subset of channels) as indicated in the VHT-SIG field of a packet. Filter adjustment and reception may be performed during the VHT-STF right after the VHT-SIG field (e.g., such as within FIG. 19).

Considering the embodiment of FIG. 19, a management frame may indicate the used and availability of channels 1, 2, 3, and 4 with channel 2 being the primary channel. In the embodiment of FIG. 19, channels 2 and 4 are used for communication (and channels 1 and 3 are not employed). This embodiment employs the non_contiguous=1 capability; however, it is noted that the same principle holds for an embodiment in which non_contiguous=0. The wireless communication device filters and receives only the primary channel up to VHT-STF, and then the wireless communication device adapts reception and filtering for the appropriate bandwidth indicated in the VHT-SIG-A field (e.g., using the channels 2 and 4 in this embodiment).

Figure 20:
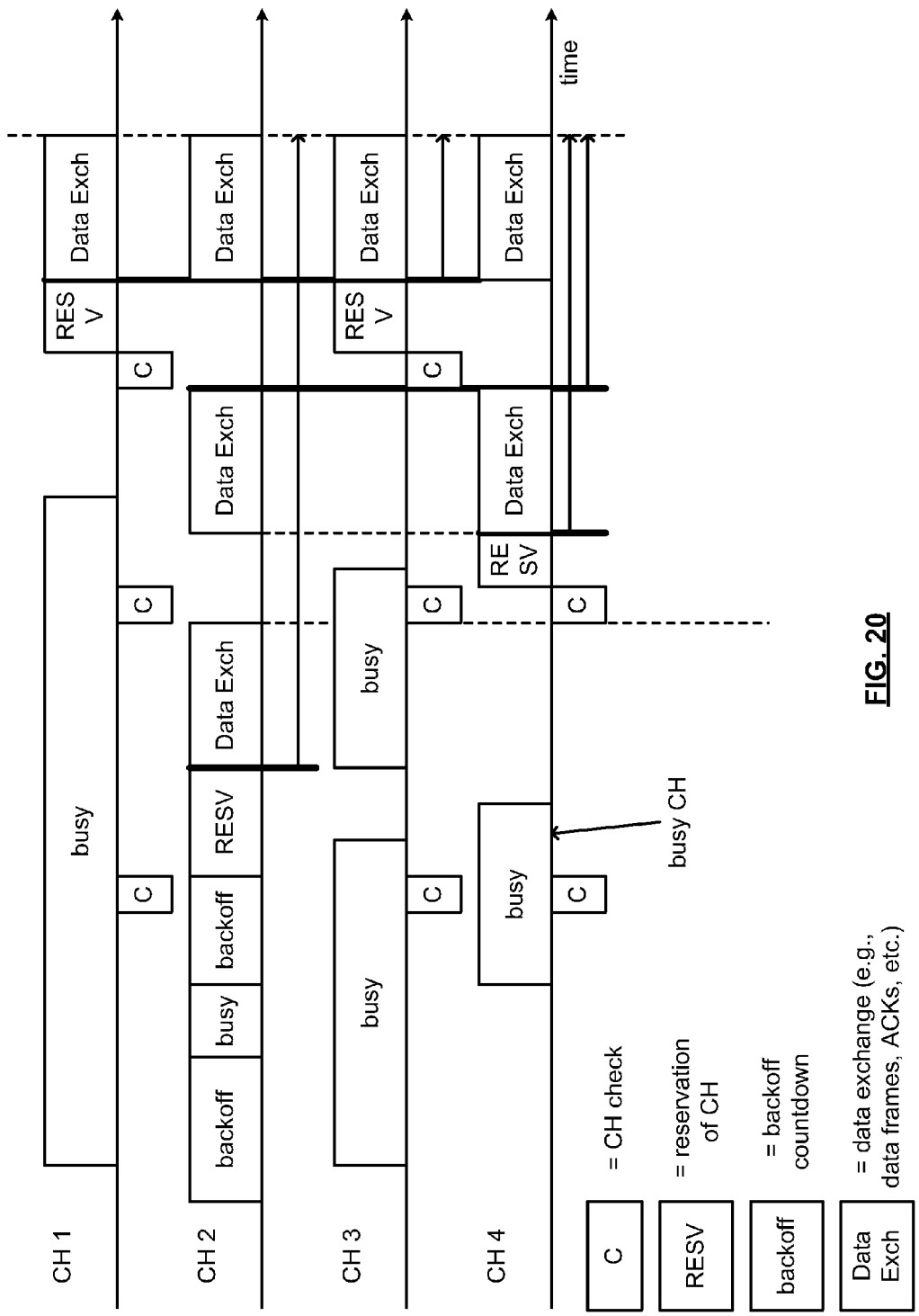
FIG. 20 is a diagram illustrating an embodiment of a timing diagram showing communications between various wireless communication devices in which at least one additional channel is added when becoming available.

FIG. 20 is a diagram illustrating an embodiment of a timing diagram showing communications between various wireless communication devices in which at least one additional channel is added when becoming available. With respect to successive channel reservation access of various channels as may be employed for communications between wireless communication devices, it is noted that the assignment of such channels may grown or increased as a function of time such when an additional channel or channels may become available. This may generally be referred to as growing the successive channel reservation access.

For example, a channel reservation may be started on whatever channel(s) are available after performing a backoff. The reservation may have duration D (e.g., such as clear to send (CTS) using a duration (DUR) value of D which is sufficient to cover at least one subsequent transmission). A frame sequence of duration D1<D may be transmitted (e.g., such a transmission may be of one or more frames, such as typically being separated by short inter-frame space (SIFS). At the end of the transmission of the frame sequence, the availability status of channels may be checked again. Then, if an additional channel (or channels) is IDLE, then a reservation can be made on that channel, for whatever time remains of the primary channel reservation. Also, more than one channel may be IDLE, and in that instance, more than one reservation can be made in parallel (e.g., 2 or more reservations in parallel).

Once one or more additional channels is/are added to the reservation, the transmission may continue now using all previously-reserved plus newly-reserved channels. Transmissions of one individual, wide-band signal, or of multiple, parallel transmissions may be made, such as to one receiving wireless communication device (e.g., STA) or to multiple receiving wireless communication devices (e.g., STAs). the communication may be stopped after a frame sequence of duration D2<(D−D1) to perform yet another channel check to see which may be IDLE. The process of adding newly available channels may be repeated to grow the bandwidth as more channels become available (e.g., reserve any additional IDLE channels with new reservations). Any channels as may be added to the reservation need necessarily be adjacent or contiguous (e.g., they may be non-adjacent or non-contiguous to the one or more channels to which reservation they are added).

Figure 21:
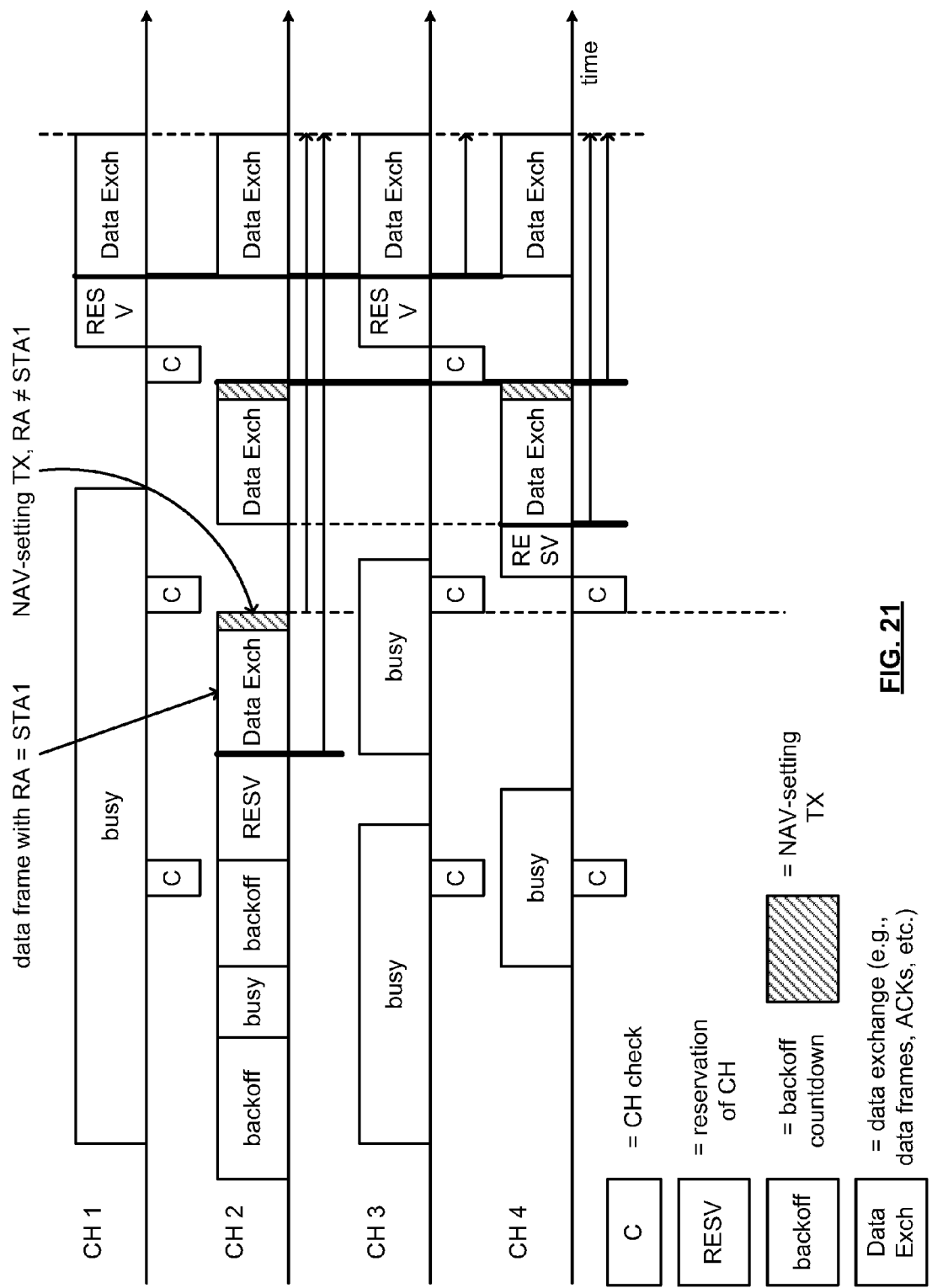
FIG. 21 and FIG. 22 are diagrams illustrating alternative embodiments of a timing diagram showing communications between various wireless communication devices in which at least one additional channel is added when becoming available.
Figure 22:
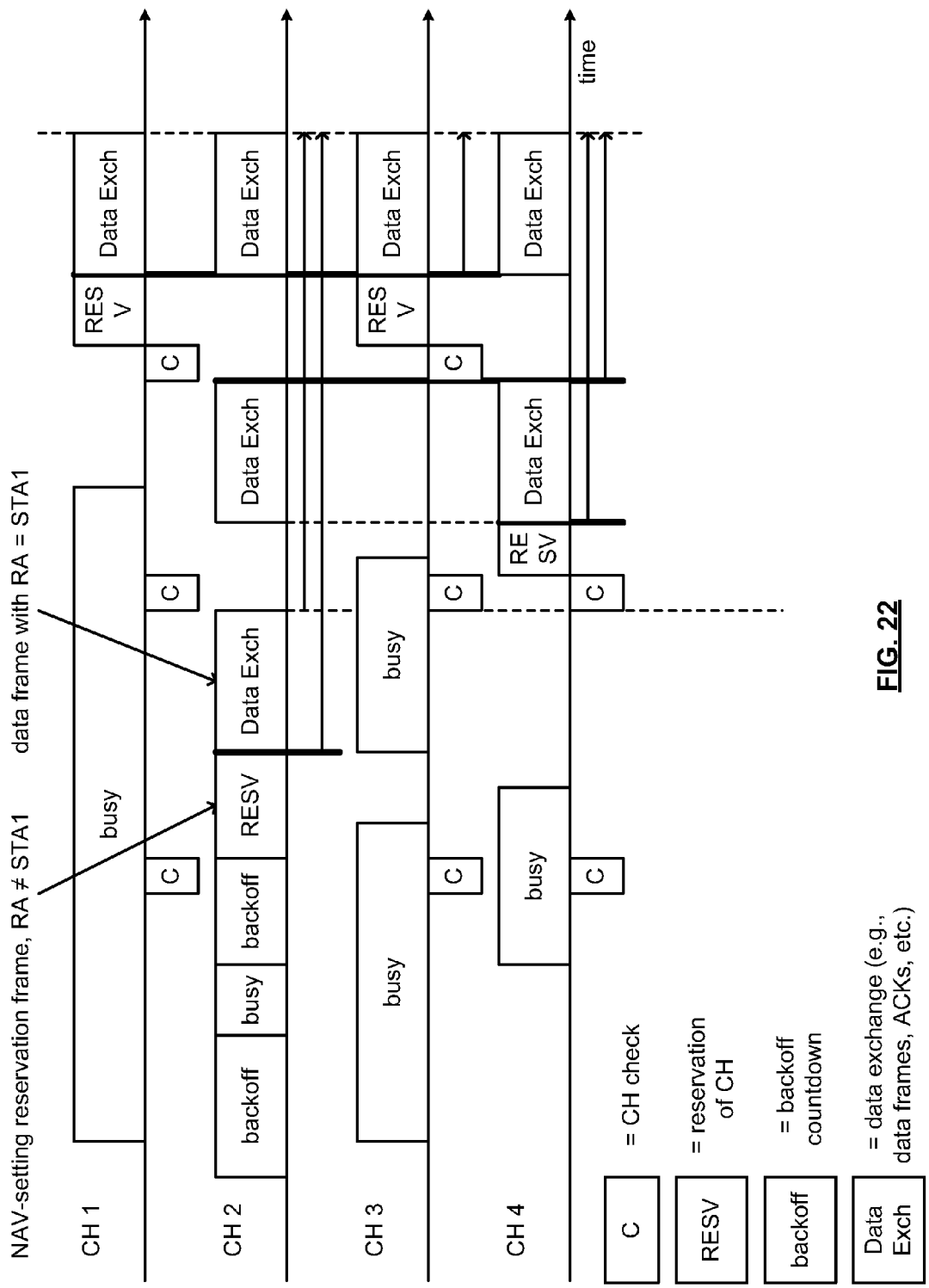

FIG. 21 and FIG. 22 are diagrams illustrating alternative embodiments of a timing diagram showing communications between various wireless communication devices in which at least one additional channel is added when becoming available. From certain perspectives, such embodiments of FIG. 21 and FIG. 22 may be viewed as being an enhancement of that which is depicted in with reference to FIG. 20.

During a subsequent check of the availability status of other channels, the transmitting wireless communication device (e.g., AP) can stops transmitting a communication. Such a communication may be stopped in order to listen on channels for IDLE. The recipient on a previously IDLE and reserved channel might identify this lack of transmission (e.g., the medium or air being free/available) as an opportunity to count backoff down and then itself perform a communication. A recipient device (e.g., receiving wireless communication device (e.g., STA)) could do this because it has not set the NAV like other receiving wireless communication devices (e.g., STAs).

Referring to the FIG. 21, a transmitting wireless communication device (e.g., AP) may be allowed to send a recipient-NAV-setting frame before checking for additional IDLE channels. For example, the NAV may be set based on an additional frame on the recipient's channel. It is noted that a NAV-setting transmission only needs to be performed once per channel.

In an alternative embodiment, such as that depicted with reference to FIG. 22, it may be ensured that a reservation frame at the beginning of channel occupancy is not particularly addressed to a recipient of the DATA Exchange.

As may be understood with respect to the embodiments of FIG. 20, FIG. 21, and FIG. 22, it is noted that, on any given channel, sequential data transmissions may be sent to the same receiver address (RA). Alternatively, sequential data transmissions may be sent to different RAs, or some combination in sequence (e.g., RA1, RA1, RA2, RA1, etc.).

At any given moment in time, parallel data transmissions may be sent to the same RA (e.g., such as additional parallel data, as redundant parallel data, etc.). Parallel data transmissions may be sent to different RA. Alternatively, a mix of both (e.g., more than one channel to a given RA, and some other channels to other RA). As may be understood, such communications may be made in accordance with multi-user (MU), on multiple channels such as in accordance with multi-user multiple input multiple output (MU-MIMO), using multiple channels, or using each channel for communications to/from one respective user.

FIG. 23A, FIG. 23B, FIG. 24, FIG. 25A, and FIG. 25B illustrate embodiments of methods for operating wireless communication devices.

Figure 23:
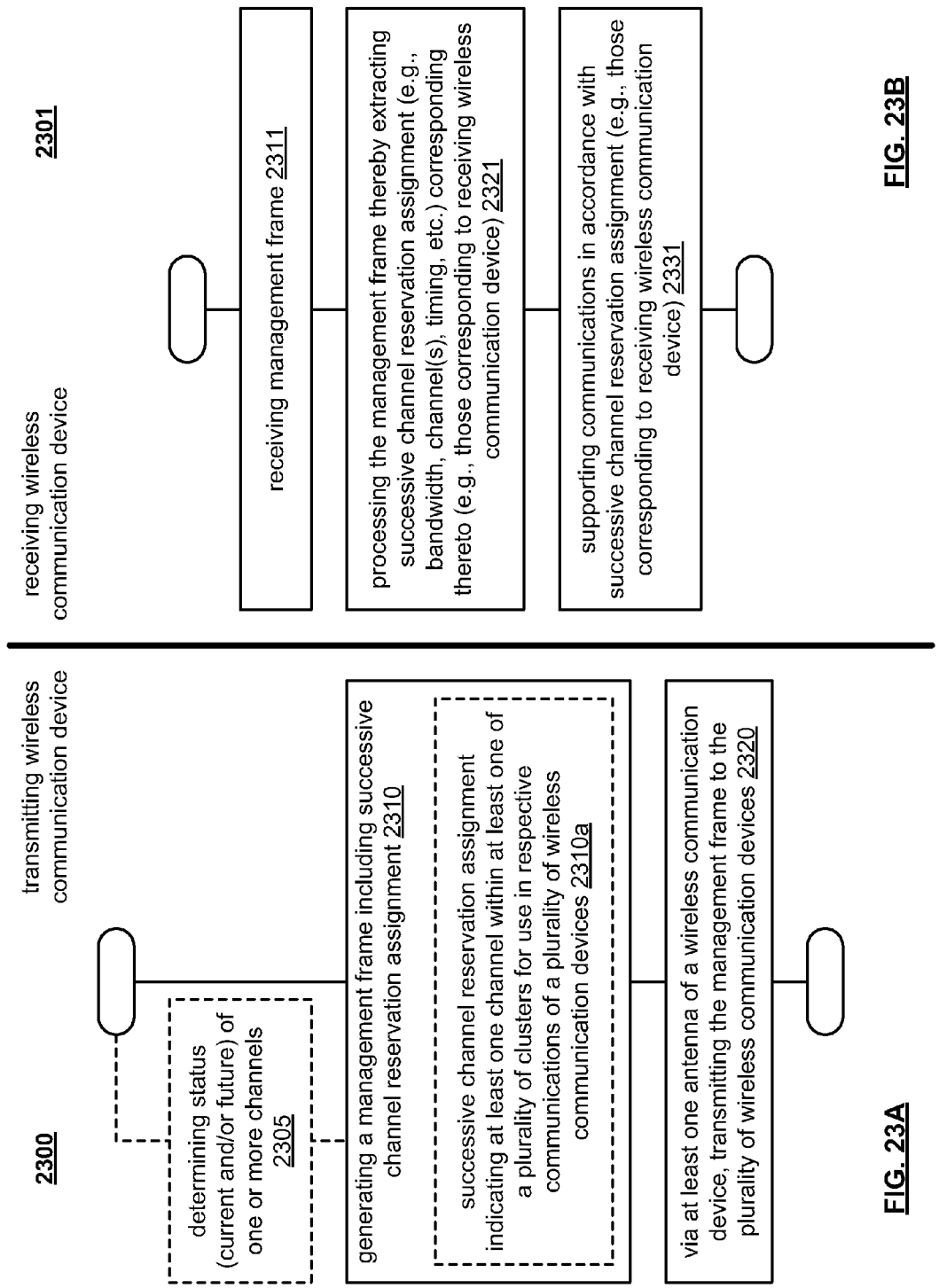

Referring to method 2300 of FIG. 23A, the method 2300 begins by generating a management frame including successive channel reservation assignment, as shown in a block 2310. In some embodiments, the method 2300 may operate by having such successive channel reservation assignment indicating at least one channel within at least one of a plurality of clusters for use in respective communications of a plurality of wireless communication devices, as shown in a block 2310*a*. Via at least one antenna of a wireless communication device, the method 2300 continues by transmitting the management frame to the plurality of wireless communication devices, as shown in a block 2320.

In some embodiments, before performing the operations of the block 2310, the method 2300 may operate by determining status (current and/or future) of one or more channels. Such determined information may be employed for generating a management frame. In one embodiment, the operations of the method 2300 may generally be viewed as being performed within a transmitting wireless communication device (e.g., such as a AP).

Referring to method 2301 of FIG. 23B, the method 2301 begins by receiving management frame, as shown in a block 2311. The method 2301 then operates by processing the management frame thereby extracting successive channel reservation assignment (e.g., bandwidth, channel(s), timing, etc.) corresponding thereto (e.g., those corresponding to receiving wireless communication device), as shown in a block 2321. The method 2301 continues by supporting communications in accordance with the extracted successive channel reservation assignment (e.g., those corresponding to receiving wireless communication device), as shown in a block 2331.

In one embodiment, the operations of the method 2301 may generally be viewed as being performed within a receiving wireless communication device (e.g., such as a STA).

Figure 24:
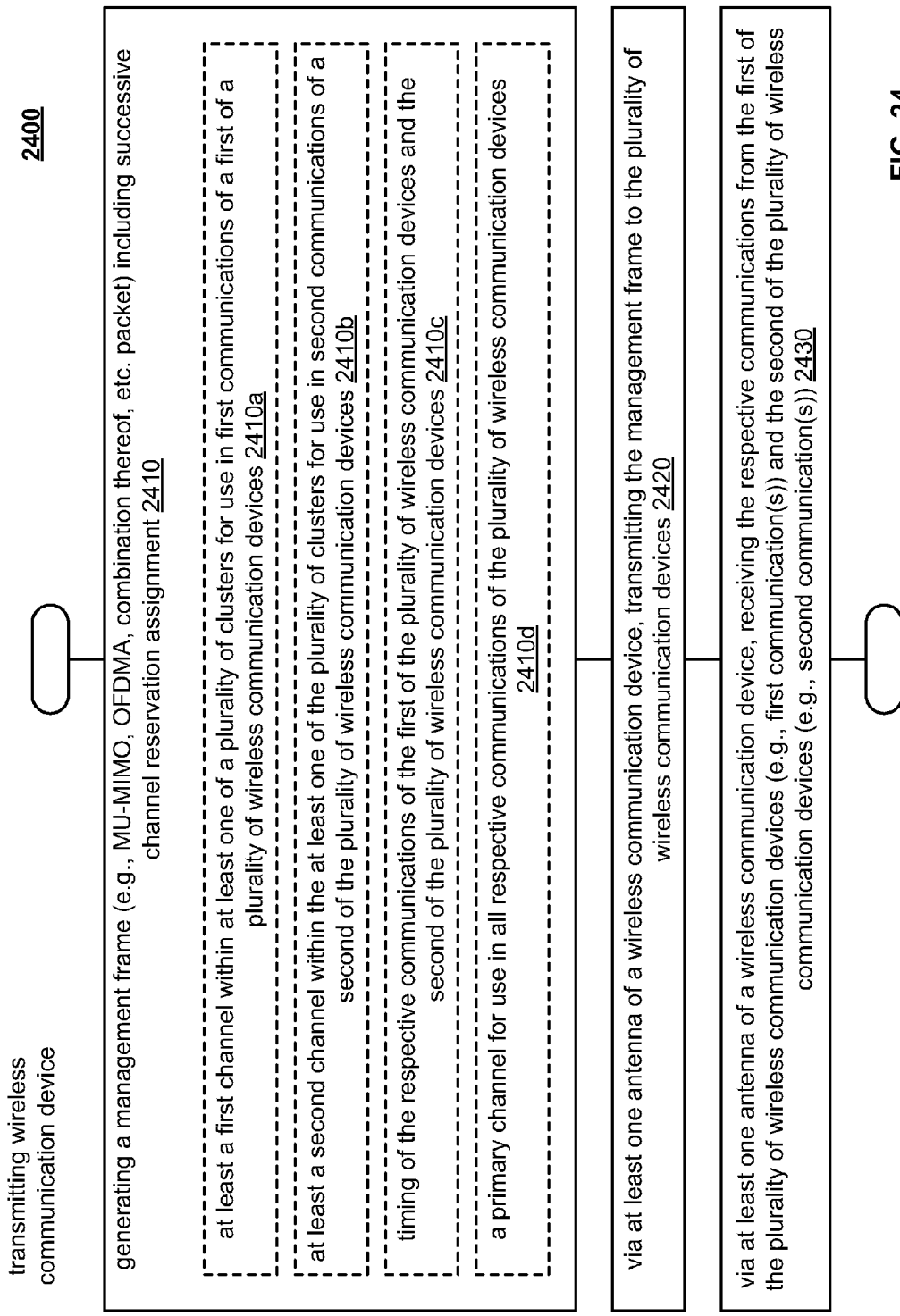

Referring to method 2400 of FIG. 24, the method 2400 begins by generating a management frame (e.g., having any desired format such as MU-MIMO, OFDMA, combination thereof, etc. packet) including successive channel reservation assignment, as shown in a block 2410.

In some embodiments, the operations of the block 2410 of method 2400 also involves ensuring the successive channel reservation assignment indicates at least a first channel within at least one of a plurality of clusters for use in first communications of a first of a plurality of wireless communication devices, as shown in a block 2410a. Such successive channel reservation assignment may also indicate at least a second channel within the at least one of the plurality of clusters for use in second communications of a second of the plurality of wireless communication devices, as shown in a block 2410b.

In certain embodiments, such successive channel reservation assignment may also include information related to timing of the respective communications of the first of the plurality of wireless communication devices and the second of the plurality of wireless communication devices, as shown in a block 2410c. In even other embodiments, such successive channel reservation assignment may also include information related to indication of a primary channel for use in all respective communications of the plurality of wireless communication devices.

Via at least one antenna of a wireless communication device, the method 2400 continues by transmitting the management frame to the plurality of wireless communication devices, as shown in a block 2420. Via that same at least one antenna of the wireless communication device (or via at least one other antenna thereof), the method 2400 then operates by receiving the respective communications from the first of the plurality of wireless communication devices (e.g., first communication(s)) and the second of the plurality of wireless communication devices (e.g., second communication(s)), as shown in a block 2430.

In one embodiment, the operations of the method 2400 may generally be viewed as being performed within a transmitting wireless communication device (e.g., such as a AP).

Referring to method 2500 of FIG. 25A, the method 2500 begins by transmitting a first communication, from a first wireless communication device to a second wireless communication device, using a first channel reservation access assignment during a first time, as shown in a block 2510. The method 2500 continues by transmitting a second communication, from the first wireless communication device to the second wireless communication device (e.g., between the same two wireless communication devices), using a second channel reservation access assignment during a second time, as shown in a block 2520.

The operations of the method 2500 may generally be viewed as being performed within a receiving wireless communication device (e.g., such as a STA).

Referring to method 2501 of FIG. 25B, within a first wireless communication device, the method 2501 begins by receiving a first communication from a second wireless communication device in accordance with a first channel reservation access assignment during a first time, as shown in a block 2511. Then, within the first wireless communication device, the method 2501 continues by receiving a second communication from a third wireless communication device (e.g., not the same wireless communication device as the second wireless communication device) in accordance with a second channel reservation access assignment during a second time, as shown in a block 2521.

In one embodiment, the operations of the method 2501 may generally be viewed as being performed within a transmitting wireless communication device (e.g., such as a AP).

It is also noted that the various operations and functions as described with respect to various methods herein may be performed within a wireless communication device, such as using a baseband processing module implemented therein (e.g., such as in accordance with the baseband processing module as described with reference to FIG. 2) and/or other components therein. For example, such a baseband processing module can perform generation of a management frame including successive channel reservation assignment in accordance with various aspects of the invention, and/or any other operations and functions as described herein, etc. or their respective equivalents.

It is noted that the various modules and/or circuitries (e.g., baseband processing modules, encoding modules and/or circuitries, decoding modules and/or circuitries, etc., etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, etc. within any of the various diagrams or as described herein may be differently implemented in different embodiments. For example, in one embodiment, such connections or couplings may be direct connections or direct couplings there between. In another embodiment, such connections or couplings may be indirect connections or indirect couplings there between (e.g., with one or more intervening components there between). Of course, certain other embodiments may have some combinations of such connections or couplings therein such that some of the connections or couplings are direct, while others are indirect. Different implementations may be employed for effectuating communicative coupling between modules, circuits, functional blocks, components, devices, etc. without departing from the scope and spirit of the invention.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. It will be obvious to one of average skill in the art that various changes and modifications may be practiced within the spirit and scope of the invention, as limited only by the scope of the appended claims.

Mode Selection Tables:

TABLE 1

| | | | | 2.4 GHz, 20/22 MHz channel BW, 54 Mbps max bit rate | | | | | |
|---|---|---|---|---|---|---|---|---|---|
| Rate | Modulation | Code Rate | NBPSC | NCBPS | NDBPS | EVM | Sensitivity | ACR | AACR |
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A method for execution by a wireless communication device, the method comprising:
    generating a management frame including successive channel reservation assignment, wherein the successive channel reservation assignment indicates at least one channel within at least one of a plurality of clusters for use in respective communications to be made by a plurality of wireless communication devices and also indicates a primary channel that is to be used in each of the respective communications; and
    via a communication interface of the wireless communication device, transmitting the management frame to the plurality of wireless communication devices.

2. The method of claim 1, wherein:
    the successive channel reservation assignment indicates a first at least one channel within the at least one of the plurality of clusters for use in first communications of a first of the plurality of wireless communication devices during a first time; and
    the successive channel reservation assignment indicates a second at least one channel within the at least one of the plurality of clusters for use in second communications of a second of the plurality of wireless communication devices during a second time.

3. The method of claim 1, wherein the at least one channel being a plurality of contiguous channels or a plurality of non-contiguous channels within the at least one of the plurality of clusters.

4. The method of claim 1, wherein the successive channel reservation assignment indicates the at least one channel within at least one of the plurality of clusters for use in respective communications by a subset of the plurality of wireless communication devices.

5. The method of claim 1, wherein the management frame being a multiple input multiple output (MU-MIMO) packet or an orthogonal frequency division multiple access (OFDMA) packet.

6. The method of claim 1 further comprising:
generating at least one additional management frame including successive channel reservation assignment, wherein the successive channel reservation assignment indicates the at least one channel or at least one additional channel within the at least one of the plurality of clusters for use in at least one additional respective communications of the plurality of wireless communication devices; and
via the communication interface of the wireless communication device, transmitting the at least one additional management frame to the plurality of wireless communication devices.

7. The method of claim 1 further comprising:
before generating the management frame, determining at least one of current and expected future availability status of at least one of a plurality of channels; and
generating the management frame based on determination of the at least one of current and expected future availability status of at least one of the plurality of channels, wherein the plurality of channels including the at least one channel.

8. The method of claim 1 further comprising:
firstly employing only the primary channel in first communications of the plurality of wireless communication devices; and
secondly employing the primary channel and at least one other channel within the at least one of a plurality of clusters in first communications of the plurality of wireless communication devices.

9. The method of claim 1 further comprising:
employing the primary channel in all respective communications of the plurality of wireless communication devices, wherein the primary channel being a channel located adjacent to and in between at least two additional channels within a band.

10. The method of claim 1 further comprising:
employing the primary channel in all respective communications of the plurality of wireless communication devices; and wherein:
the primary channel including a first channel within the at least one of the plurality of clusters and a second channel within the at least one of the plurality of clusters; and
the first channel being non-adjacent to the second channel.

11. The method of claim 1 further comprising:
employing the primary channel in all respective communications of the plurality of wireless communication devices; and wherein:
the plurality of wireless communication devices including a first wireless communication device having a first capability and a second wireless communication device having a second capability being a legacy capability relative to the first capability; and
all communications corresponding to the second wireless communication device being performed only on the primary channel.

12. The method of claim 1, wherein the successive channel reservation assignment indicates timing of the respective communications of the plurality of wireless communication devices.

13. The method of claim 1, wherein:
a first of the plurality of clusters being composed of the at least one channel within a first band; and
a second of the plurality of clusters being composed of at least one additional channel within a second band.

14. The method of claim 1, wherein:
a first of the plurality of clusters being composed of a first plurality of channels among a first band and a second band; and
a second of the plurality of clusters being composed of a second plurality of channels among a third band and a fourth band.

15. The method of claim 1, wherein: 1 further comprising:
an access point (AP), wherein the plurality of wireless communication devices includes a plurality of wireless stations (STAs).

16. A method for execution by a wireless communication device, the method comprising:
generating a management frame that is a multiple input multiple output (MU-MIMO) packet or an orthogonal frequency division multiple access (OFDMA) packet including successive channel reservation assignment, wherein the successive channel reservation assignment indicates:
at least a first channel within at least one of a plurality of clusters for use in first communications of a first of a plurality of wireless communication devices;
at least a second channel within the at least one of the plurality of clusters for use in second communications of a second of the plurality of wireless communication devices;
timing of the respective communications of the first of the plurality of wireless communication devices and the second of the plurality of wireless communication devices; and
a primary channel for use in all respective communications of the plurality of wireless communication devices; and
via a communication interface of the wireless communication device:
transmitting the management frame to the plurality of wireless communication devices; and
receiving the respective communications from the first of the plurality of wireless communication devices and the second of the plurality of wireless communication devices.

17. The method of claim 16, wherein the at least the first channel or the at least the second channel being a plurality of contiguous channels or a plurality of non-contiguous channels within the at least one of the plurality of clusters.

18. The method of claim 16 further comprising:
before generating the management frame, determining at least one of current and expected future availability status of at least one of a plurality of channels; and
generating the management frame based on determination of the at least one of current and expected future availability status of at least one of the plurality of channels, wherein the plurality of channels including the at least one channel.

19. The method of claim 16 further comprising:
an access point (AP), wherein the plurality of wireless communication devices being a plurality of wireless stations (STAs).

20. A wireless communication device comprising:
a communication interface; and
a process, the processor and the communication interface configured to:
generate a management frame including successive channel reservation assignment, the successive channel reservation assignment indicates at least one channel within at least one of a plurality of clusters for use in respective communications to be made by a plurality of wireless communication devices and also indicates a primary channel that is to be used in each of the respective communications; and transmit the management frame to the plurality of wireless communication devices.

21. The wireless communication device of claim 20, wherein:
the successive channel reservation assignment indicates a first at least one channel within the at least one of the plurality of clusters for use in first communications of a first of the plurality of wireless communication devices during a first time; and
the successive channel reservation assignment indicates a second at least one channel within the at least one of the plurality of clusters for use in second communications of a second of the plurality of wireless communication devices during a second time.

22. The wireless communication device of claim 20, wherein the at least one channel being a plurality of contiguous channels or a plurality of non-contiguous channels within the at least one of the plurality of clusters.

23. The wireless communication device of claim 20, wherein the successive channel reservation assignment indicates the at least one channel within at least one of the plurality of clusters for use in respective communications by a subset of the plurality of wireless communication devices.

24. The wireless communication device of claim 20, wherein the management frame being a multiple input multiple output (MU-MIMO) packet or an orthogonal frequency division multiple access (OFDMA) packet.

25. The wireless communication device of claim 20 further comprising:
the processor configured to generate at least one additional management frame including successive channel reservation assignment, the successive channel reservation assignment indicates the at least one channel or at least one additional channel within the at least one of the plurality of clusters for use in at least one additional respective communications of the plurality of wireless communication devices; and
the communication interface configured to transmit the at least one additional management frame to the plurality of wireless communication devices.

26. The wireless communication device of claim 20 further comprising:
before generating the management frame, the processor configured to determine at least one of current and expected future availability status of at least one of a plurality of channels; and
the processor configured to generate the management frame based on determination of the at least one of current and expected future availability status of at least one of the plurality of channels, wherein the plurality of channels including the at least one channel.

27. The wireless communication device of claim 20, wherein:
the successive channel reservation assignment indicates use of only the primary channel in first communications of the plurality of wireless communication devices; and
the successive channel reservation assignment indicates use of the primary channel and at least one other channel within the at least one of a plurality of clusters in second communications of the plurality of wireless communication devices.

28. The wireless communication device of claim 20, wherein:
the primary channel being employed in all respective communications of the plurality of wireless communication devices; and
the primary channel being a channel located adjacent to and in between at least two additional channels within a band.

29. The wireless communication device of claim 20, wherein:
the primary channel being employed in all respective communications of the plurality of wireless communication devices;
the primary channel including a first channel within the at least one of the plurality of clusters and a second channel within the at least one of the plurality of clusters; and
the first channel being non-adjacent to the second channel.

30. The wireless communication device of claim 20, wherein:
the primary channel being employed in all respective communications of the plurality of wireless communication devices;
the plurality of wireless communication devices including a first wireless communication device having a first capability and a second wireless communication device having a second capability being a legacy capability relative to the first capability; and
all communications corresponding to the second wireless communication device being performed only on the primary channel.

31. The wireless communication device of claim 20, wherein the successive channel reservation assignment indicates timing of the respective communications of the plurality of wireless communication devices.

32. The wireless communication device of claim 20, wherein:
a first of the plurality of clusters being composed of the at least one channel within a first band; and
a second of the plurality of clusters being composed of at least one additional channel within a second band.

33. The wireless communication device of claim 20, wherein:
a first of the plurality of clusters being composed of a first plurality of channels among a first band and a second band; and
a second of the plurality of clusters being composed of a second plurality of channels among a third band and a fourth band.

34. The wireless communication device of claim 20 further comprising:
an access point (AP), wherein the plurality of wireless communication devices being a plurality of wireless stations (STAs).

* * * * *